(12) United States Patent
Bianchi et al.

(10) Patent No.: US 8,456,865 B1
(45) Date of Patent: Jun. 4, 2013

(54) SINGLE STAGE MICRO-INVERTER WITH H-BRIDGE TOPOLOGY COMBINING FLYBACK AND FORWARD OPERATING MODES

(75) Inventors: Andrea Bianchi, Arezzo (IT); Massimo Valiani, Corciano (IT)

(73) Assignee: Power-One, Inc., Camarillo, CA (US)

( * ) Notice: Subject to any disclaimer, the term of this patent is extended or adjusted under 35 U.S.C. 154(b) by 162 days.

(21) Appl. No.: 12/817,726

(22) Filed: Jun. 17, 2010

(51) Int. Cl.
*H02M 3/335* (2006.01)
*H02M 3/24* (2006.01)

(52) U.S. Cl.
USPC ............ 363/17; 363/21.05; 363/98; 323/906

(58) Field of Classification Search
USPC .................... 363/21.05, 1.13, 95, 97, 98, 131, 363/132, 21.13, 21.12, 17; 323/906
See application file for complete search history.

(56) References Cited

U.S. PATENT DOCUMENTS

| | | | |
|---|---|---|---|
| 6,215,683 B1 * | 4/2001 | Mao | 363/142 |
| 7,161,816 B2 * | 1/2007 | Shteynberg et al. | 363/21.13 |
| 7,170,763 B2 * | 1/2007 | Pai et al. | 363/21.16 |
| 7,324,361 B2 * | 1/2008 | Siri | 363/95 |
| 7,414,869 B2 * | 8/2008 | Nakahori | 363/71 |
| 7,796,412 B2 * | 9/2010 | Fornage | 363/97 |
| 8,085,565 B2 * | 12/2011 | Huang et al. | 363/132 |
| 2009/0257250 A1 * | 10/2009 | Liu | 363/21.06 |
| 2010/0097827 A1 * | 4/2010 | Ben-Yaakov | 363/65 |

* cited by examiner

*Primary Examiner* — Bao Q Vu
*Assistant Examiner* — Zekre Tsehaye
(74) *Attorney, Agent, or Firm* — Waddey & Patterson, P.C.; Mark J. Patterson; Gary L. Montle

(57) ABSTRACT

A microinverter is provided for converting DC energy from a PV panel into a grid-compatible AC signal. A first plurality of switching elements is coupled between a DC energy source and a primary winding of a transformer. A second plurality of switching elements is coupled to a secondary winding of the transformer. Current sensors sense real time converter parameters including a DC input, an AC output, and a primary current. A digital controller determines an operating mode for the converter based on a DC input signal, with the controller further including a switch signal generator circuit configured to adjust switching states. The switch state adjustments are based on the operating mode, real time converter parameters which include the DC input signal, an AC signal for output to a grid, a primary current, and a desired shape for the AC output signal waveform.

17 Claims, 18 Drawing Sheets

SINGLE STAGE MICRO-INVERTER WITH
H-BRIDGE TOPOLOGY COMBINING
FLYBACK AND FORWARD OPERATING
MODES

A portion of the disclosure of this patent document contains material that is subject to copyright protection. The copyright owner has no objection to the reproduction of the patent document or the patent disclosure, as it appears in the U.S. Patent and Trademark Office patent file or records, but otherwise reserves all copyright rights whatsoever.

CROSS-REFERENCES TO RELATED APPLICATIONS

None.

BACKGROUND OF THE INVENTION

The present invention relates generally to micro-inverters designed to convert DC energy from a solar panel to AC energy suitable for grid connected applications. More particularly, the present invention relates to single stage, isolated micro-inverters having controllers for alternating operating modes in an H-bridge converter topology.

Traditionally, systems utilizing solar energy have relied on centralized inverters having a plurality of solar panels providing an output into a single unit. This type of system has certain drawbacks, most notably in the costs involved but also in efficiency. For this reason solar energy has often been an energy source of the last resort where no other form is reasonably available.

More recently, "micro-inverters" have been developed to reduce the costs and increase the efficiency with which solar energy may be captured and converted. Each solar panel, or photovoltaic panel, provides a DC signal to an individual associated micro-inverter, which converts the DC signal to an isolated AC output that is suitable for many standard household operations. The various AC outputs may further be combined and suitable for grid-connected applications.

Many topologies have been investigated, published and patented in recent years. However, for these micro-inverters the most promising approach to achieve the required efficiency appears to be single-stage, current-fed isolated inverters. In these topologies the converter carries out the functions of maximum power point tracking (MPPT), current shaping, and insulation between the photovoltaic (PV) panel and the grid all at the same time.

Current transition mode is commonly used to obtain high energy conversion efficiency. This operative mode, if a traditional approach is used, leads to a very broad switching frequency operative range. This fact increases converter losses, making it very difficult to properly control the output current. Further, the broad switching frequency range makes it almost impossible to implement a DSP-based fully digital control.

Therefore, there is a need for a system and method for more efficiently converting solar-based DC energy to AC energy suitable for grid connections.

Further, there is a need for a system and method for a converter topology having an operating mode that facilitates improved control functions and reduces cost.

BRIEF SUMMARY OF THE INVENTION

In accordance with the present invention, a control strategy is provided for a single stage isolated solar micro-inverter based on an H-bridge converter topology utilizing one or both of flyback and forward operating modes. The converter receives a DC signal from a solar photovoltaic panel and converts the DC signal using an isolation transformer and a plurality of switches to an AC output signal for an electric grid. The average output current calculated in each switching period is desirably a sinusoidal waveform that is phase-locked to the electric grid signal. The amplitude of the waveform is dependent on the available power provided by the photovoltaic panel. The output current is shaped by the converter operation with regards to a primary side current and primary winding of the isolation transformer to maintain a proper sinusoidal waveform. The primary current shape necessary to produce the sinusoidal output current is dependent on the operating mode of the converter.

At high amplitude current provided from the DC panel, the converter circuitry operates in forward mode. By proper control of the primary side switch states, the primary side current across an inductor coupled to the primary side of the transformer may be shaped. The transformer carries out insulation and voltage boost, while secondary side switches with integrated diodes program the output current path. At low current, the circuitry operates in flyback mode. In this case the current control is obtained using the large value magnetizing isolation transformer, so as to easily keep the output current under tighter control. Notably, interleaving operation is not required for a converter of the present invention.

Because the output current is desirably a sinusoidal waveform having certain characteristics at full load, the control will switch from flyback to forward mode four times during each grid voltage period. While at very low load, however, the operating mode could remain fully in flyback mode. Alternatively, the operating mode could be programmed to remain fully in forward mode.

Based on the selected operating mode, a controller which includes a digital signal processor calculates a required peak primary current to maintain the average output current in a sinusoidal shape. A predictive feed-forward circuit calculates a converter on-time and switching period. Various sensors provide real-time feedback to the controller regarding the DC input from the photovoltaic panel, the AC output to the grid and the primary current. The controller then uses digital regulators to adjust the predicted values in real time based on the sensed circuit parameters.

In an embodiment of the present invention, a solar energy converter is provided for supplying power to an AC load. A first plurality of switching elements is coupled between a photovoltaic solar panel configured to generate DC energy and a primary winding of a transformer. A second plurality of switching elements is coupled to a secondary winding of the transformer. A digital controller is provided for determining an operating mode for the converter based on a DC input signal from the solar panel. The controller includes a switch signal generator circuit for adjusting switch states of the switches based on the operating mode, at least one of a plurality of real time converter parameters, and a desired waveform configuration for an AC output signal. The real time converter parameters may include the DC input signal, the AC output signal, and a current in the primary winding.

In another embodiment, a method is provided for converting solar energy. In a first step, an isolation transformer is provided having a primary winding coupled to a solar panel and a secondary winding coupled to an AC load. In a second step, a first plurality of converter switches is coupled between the primary winding and the solar panel in an H-bridge configuration, and a second plurality of converter switches is further coupled to the secondary winding and the AC load. In a third step, a DC input signal from the solar panel and an AC output signal across the AC load are sensed. In a fourth step, the method includes calculating a plurality of nominal converter switching parameters. A fifth step includes generating control signals for adjusting switching states of the first plurality of converter switches based on at least one of the nominal converter switching parameters and a converter operating mode associated with the sensed DC input signal, wherein a current across the primary winding is generated. A sixth step of the method is generating control signals for adjusting switching states of the second plurality of converter switches based on at least one of the nominal converter switching parameters and the converter operating mode, wherein the AC output signal is generated with a desired waveform. In additional steps, the method may include sensing the generated current across the primary winding, and adjusting one or more of the converter switching parameters based on at least the sensed primary current.

In another embodiment, a micro-inverter is described for converting DC energy to AC energy suitable for a grid. An isolation transformer is provided having a primary winding and a secondary winding. A primary circuit coupled on a first end to a DC input source and further coupled on a second end to the primary winding includes a plurality of switches in an H-bridge configuration. A secondary circuit is coupled to the secondary winding and is further coupled to an AC load includes a plurality of switches configured for shaping an AC output current to the AC load. A feed-forward circuit is programmed to calculate a switching period, a switch on-time and a predicted peak current in the primary winding for the switching period. A switch control circuit is programmed to adjust switch states of the plurality of switches in both of the primary and secondary circuits, with the switch states selected in accordance with an operating mode further associated with an amplitude of a DC input signal from the DC source. The switch states are further adjusted in accordance with the calculated switching period and peak primary winding current.

DETAILED DESCRIPTION OF THE INVENTION

Figure 1:
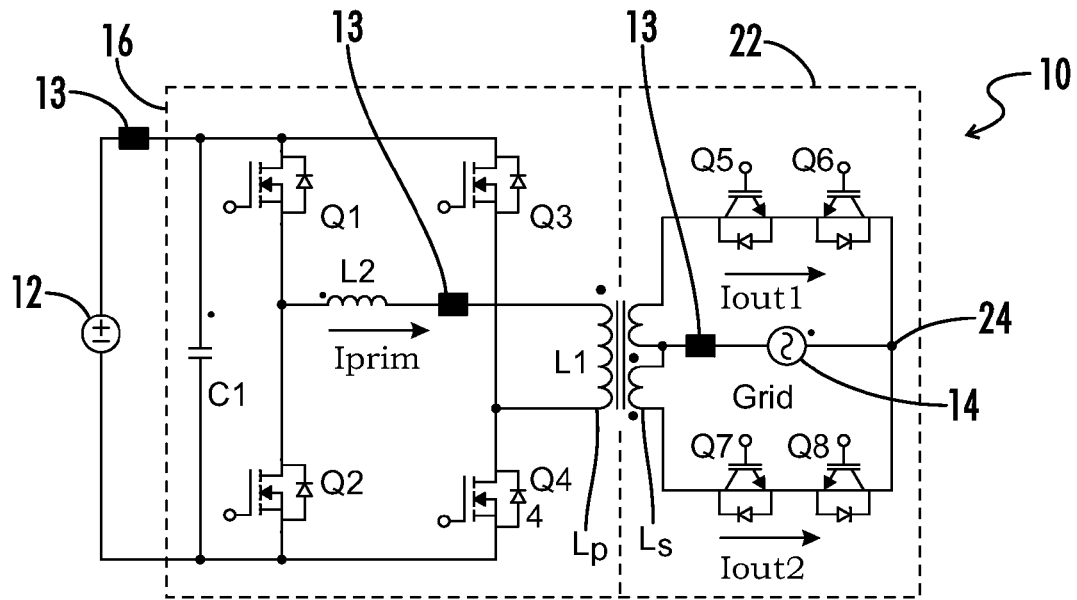
FIG. 1 is a circuit schematic of one embodiment of the present invention.

Throughout the specification and claims, the following terms take at least the meanings explicitly associated herein, unless the context dictates otherwise. The meanings identified below do not necessarily limit the terms, but merely provide illustrative examples for the terms. The meaning of "a," "an," and "the" may include plural references, and the meaning of "in" may include "in" and "on." The phrase "in one embodiment," as used herein does not necessarily refer to the same embodiment, although it may. The term "coupled" means at least either a direct electrical connection between the connected items or an indirect connection through one or more passive or active intermediary devices. The term "circuit" means at least either a single component or a multiplicity of components, either active and/or passive, that are coupled together to provide a desired function. The term "signal" means at least one current, voltage, charge, temperature, data or other signal. The scope of the term "AC load" may include any AC voltage source, AC voltage sink, or AC electric utility grid to which AC energy may be suitably fed.

Where either a field effect transistor (FET) or a bipolar junction transistor (BJT) may be employed as an embodiment of a transistor, the scope of the terms "gate," "drain," and "source" includes "base," "collector," and "emitter," respectively, and vice-versa. The term "switch" or "switching element" as used interchangeably herein may refer to an insulated gate bipolar transistor (IGBT) as shown in the drawings provided, but the scope of the present invention is not so limited, and the switching functions may be performed by any equivalent device as known to one of skill in the art.

Referring generally to FIGS. 1-19d, various embodiments of a system and method for converting DC energy from a DC source to be isolated and suitable for powering an AC load is described herein.

Referring to FIG. 1, in various embodiments of the present invention a micro-inverter system 10 is provided for converting solar energy. A large value magnetizing transformer L1 functions to isolate a photovoltaic solar panel 12 coupled to the primary winding Lp of the transformer L1 from an AC load 14 such as for example an AC electric utility grid 14 coupled to the secondary winding Ls of the transformer L1.

The system may include a plurality of current sensors for detecting values of a DC input signal from the solar panel 12, an AC output signal to the grid 14, and a primary current in the primary winding Lp of the transformer L1. The current sensors may be provided in any of a variety of forms such as resistors having known values to name merely one example, and may be positioned in any of a variety of locations within the inverter topology wherein the current across the current sensor may detect the desired signal. The potential forms and positions of the current sensors are well known to those of skill in the art and are accordingly not described further herein.

Coupled between the photovoltaic panel 12 and the primary winding Lp is an input stage 16 or primary circuit 16 including a capacitor C1, an H-bridge circuit having a first pair of switching elements or switches Q1, Q2 with integrated diodes and a second pair of switching elements or switches Q3, Q4 with integrated diodes, and an inductor L2 having a first end coupled to a first node 18 between the first pair of switches Q1, Q2 and a second end coupled to a first end of the primary winding Lp. The second end of the primary winding Lp is coupled to a second node 20 between the second pair of switches Q3, Q4.

In alternative embodiments (not shown), the inductor L2 can be incorporated within the transformer L1 and coupled in series with the primary winding Lp of the transformer L1. Properly winding the transformer L1 is possible to obtain the proper leakage inductance.

Returning to an embodiment as shown in FIG. 1, coupled to the secondary winding Ls of the transformer L1 is an output stage 22 or secondary circuit 22. The secondary circuit 22 includes a third pair of switches Q5, Q6 coupled on a first end to a first end of the secondary winding Ls and coupled on a second end to a third node 24. A fourth pair of switches Q7, Q8 is coupled on a first end to a second end of the secondary winding Ls and coupled on a second end to the third node 24. The AC load 14 is coupled on a first end to a center tap of the secondary winding Ls of the transformer L1 and coupled on a second end to the third node 24. The secondary circuit 22 as described further defines a current path Iout1 across the third pair of switches Q5, Q6, a current path Iout2 across the fourth pair of switches Q7, Q8, the current paths Iout1, Iout2 defining the shape of an average output current Igrid across an output current path between the center tap of the secondary winding Ts and the third node 24, and provided to the AC load 14.

Figure 2:
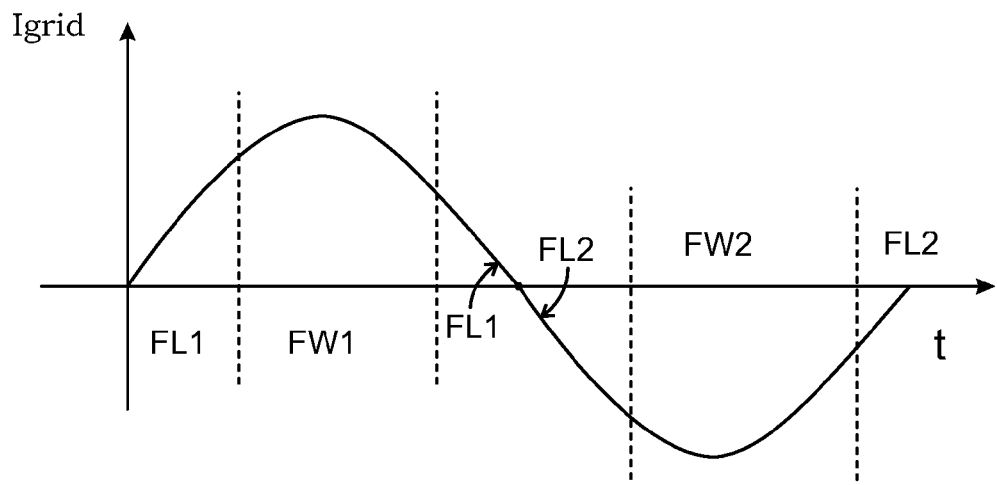
FIG. 2 is an x-y graphical display of an output current waveform with respect to time, showing various operative modes of an embodiment of the present invention.

Referring now to FIGS. 1-2, the current through the primary winding Lp of the transformer L1, or primary current (Iprim), may further be shaped to create an average output current (Igrid) having a desired waveform. In an embodiment as shown, the average output current calculated in each switching period (t) is desirably a sinusoidal waveform that is phase-locked in accordance with the AC power grid signal. The amplitude of the waveform is dependent at least in part on the available power provided by the photovoltaic panel 12.

The shape of the primary current necessary to provide an average output current having a pure sinusoidal waveform is dependent on the operating mode of the converter. The operating mode of the converter may in various embodiments be determined by comparing the detected DC input signal from the photovoltaic panel 12 to one or more predetermined thresholds. More particularly, the output current that will result from the detected DC input signal may be compared to one or more predetermined thresholds.

In an embodiment as shown in FIG. 2, the operating mode is determined by comparing the amplitude of the sinusoidal output current, as determined with respect to the detected DC signal, to a threshold delineating currents proximate a peak value from currents proximate a zero crossing. The converter operating mode may change as the amplitude crosses above and below the threshold, into regions that may be further defined herein as high current (near peak) and low current (near zero crossing). Alternatively, the converter may be configured to change operating modes automatically from one switching period to the next, with the time periods varying in accordance with detected current.

Figure 12:
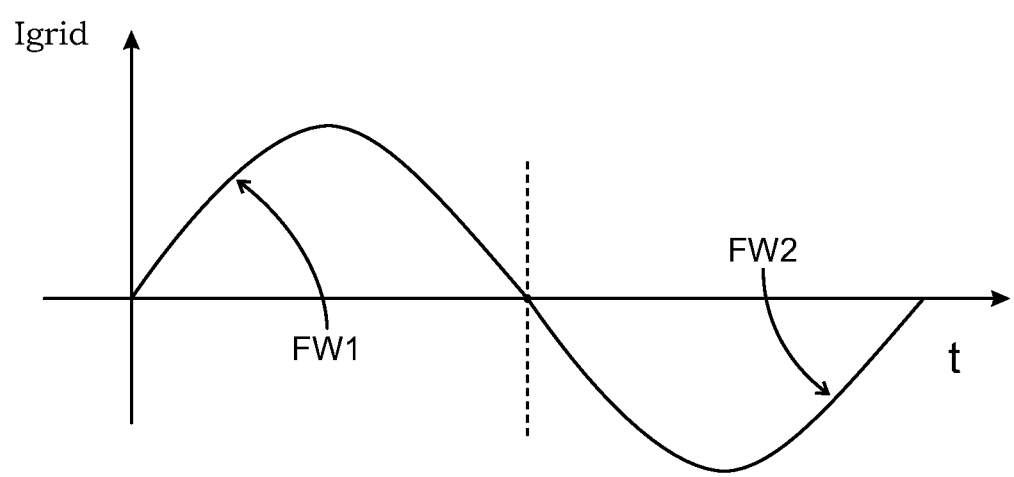
FIG. 12 is an x-y graphical display of an output current waveform with respect to time, showing various operative modes of an embodiment of the present invention.

In other embodiments such as shown for example in FIG. 12, the converter operating mode may change as the output current value crosses above and below the zero crossing.

Returning to embodiments as shown in FIGS. 1-2, at high input current from the photovoltaic panel 12 the converter circuitry works in a forward operating mode. Proper switching of the primary side switching elements Q1, Q2, Q3, and Q4 may shape the primary current on the primary side inductor L2. The value of the primary side inductor L2 is generally quite small, for example about 3 μH. The transformer L1 carries out the insulation and the voltage boost, while the secondary side output switches Q5, Q6, Q7, and Q8 with integrated diodes are programming the current path. At low currents as shown on the waveform of FIG. 2, the circuitry functions in a flyback operating mode. In this case the current control is obtained using the large value magnetizing transformer L1, which may have an inductance of for example about 40 μH, and keeping the output current under control becomes a much simpler task.

Because the output current as described before is optimally a sinusoidal waveform, the converter will switch from flyback to forward operating mode four times during each grid voltage period (t) at normal loads. While at very low loads, in various embodiments the operating mode may remain fully flyback. In further alternative embodiments as described below the converter may be configured within the scope of the present invention to function in forward mode only.

Figure 9:
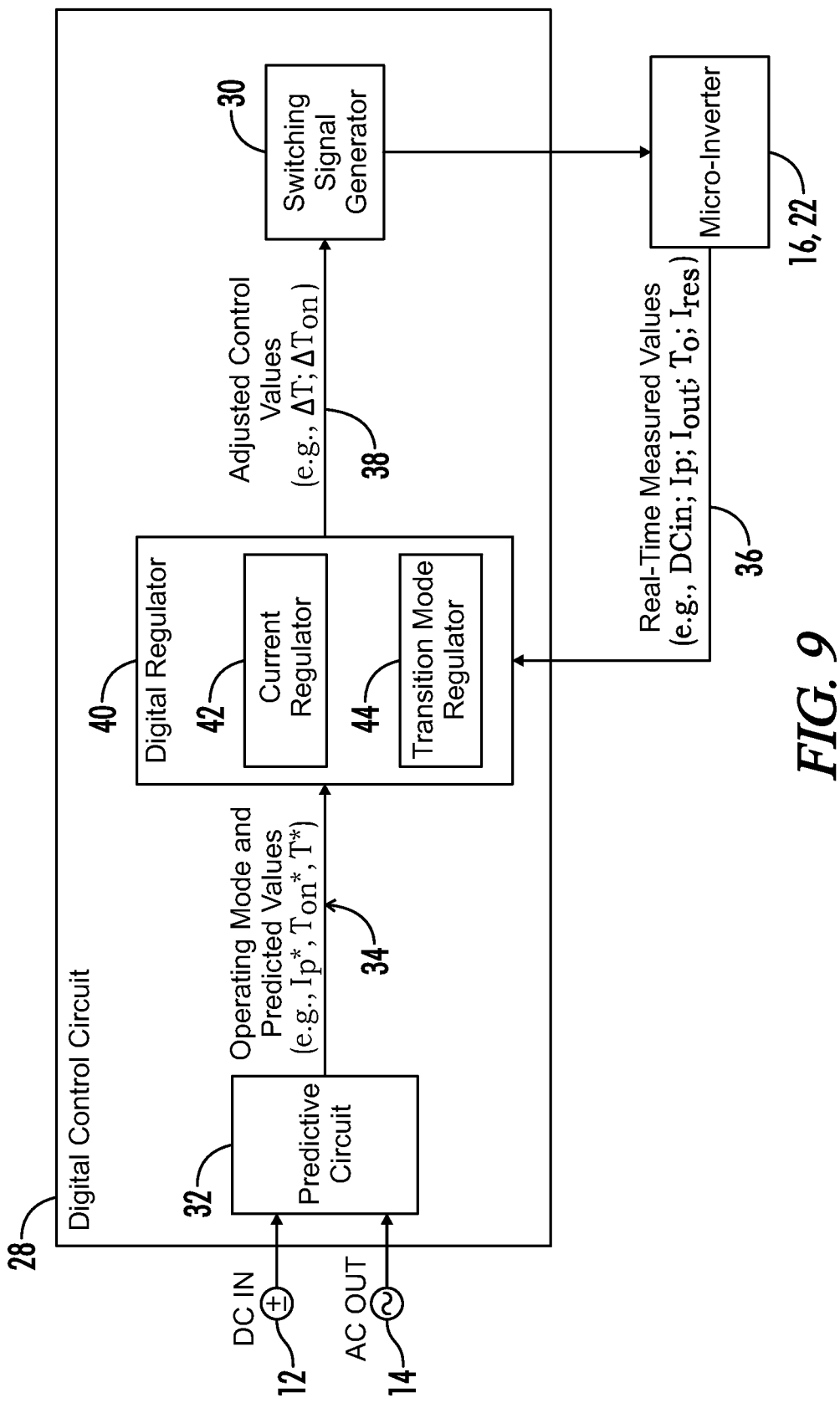
FIG. 9 is a block diagram of an embodiment of a flyback operating mode control method for the controller of the present invention.

Referring generally now to FIG. 9, a digital control circuit 28 is coupled to the primary side 16 and the secondary side 22 of a micro-inverter 10 and includes a switch signal generator circuit 30 configured to adjust the switch states of the switches Q1-Q8. A predictive circuit 32 is coupled to receive a DC input signal from the photovoltaic panel 12 and an AC output signal from the AC grid 14. Based on the received signals, the predictive circuit 32 determines the operating mode for the converter during the next switching period, and further calculates a predicted peak primary current value (Ip*), a predicted switch on-time (Ton*) and a predicted switching period (T*) in accordance with the received signals, the determined operating mode and the desired sinusoidal output current shape. The pattern of switch state adjustment is generally dependent on the operating mode predicted by the control circuit 28 based on the detected AC grid signal. The predicted on-time value and switching period may later be adjusted by the controller 28 based on additional detected real-time parameters as further described below.

In various embodiments the predictive circuit 32 may be a feed-forward circuit 32. The physical arrangement of the feed-forward circuit 32 with respect to the digital control circuit 28 is not critical, as they may be located separately or integrally formed on a single integrated chip, or may include overlapping circuitry. In either case, the feed-forward circuit 32 provides predicted values which may then be adjusted by closed-loop control circuitry associated with the digital control circuit 28 if necessary as determined by additional measured parameters.

Figure 3A:
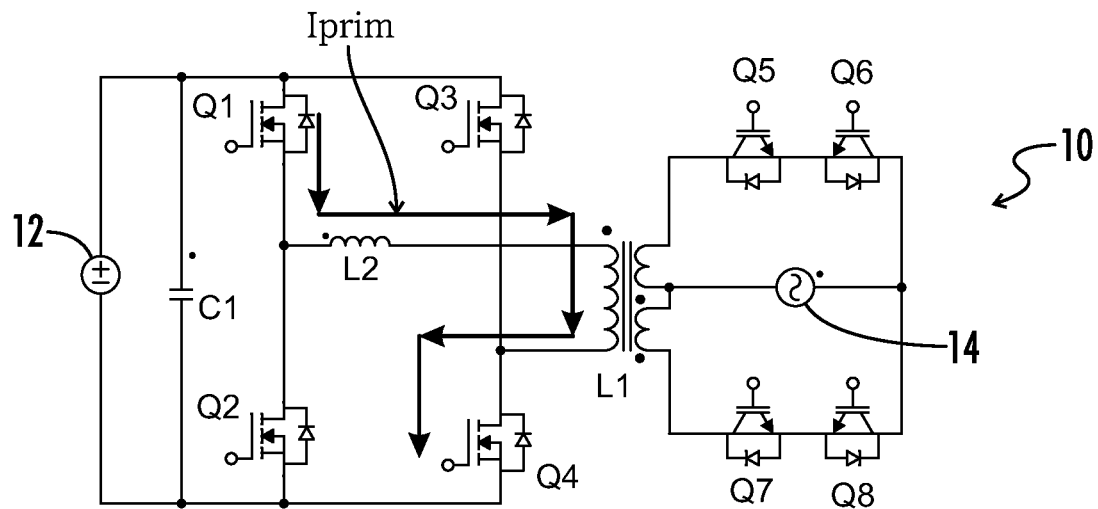
FIGS. 3a-3b are circuit schematics of the embodiment of FIG. 1 showing switch states and current flow in flyback mode FL1.

Now referring to FIGS. 2, 3a-3b, 5a-5d, 7a-7b and 8a-8d, operation of the switches Q1-Q8 and the switch signal generation circuit 30 is described in accordance with various operating modes of the converter. At the beginning of a grid voltage period (t) on the positive half-sine-wave output current, when the current is low the converter is operating in a flyback mode FL1. The initial switch state is set to Q1=Q4=ON, Q2=Q3=OFF, Q5=ON, Q6=Q7=Q8=OFF. In this switch state, the primary side current Iprim flows through switches Q1, Q4 and the energy is stored in the primary side inductor L2 and the transformer L1 as shown in FIG. 3a.

Figure 3B:
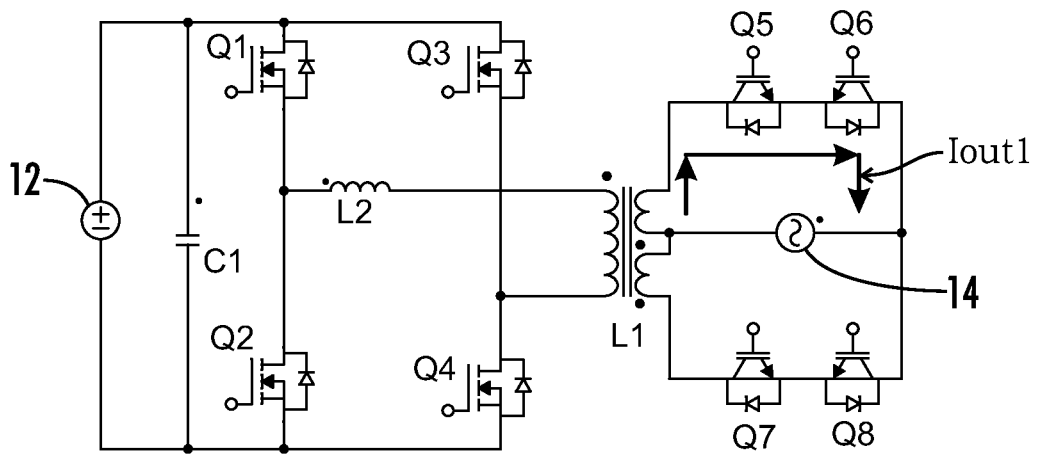

As soon as the predicted switch-on time (Ton*) has been reached, which is intended to occur when the primary current reaches its predicted peak value (Ip*), the switch state is changed to Q1=Q4=Q2=Q3=OFF, Q5=ON, Q6=Q7=Q8=OFF. The energy stored on the transformer L1 flows to the grid 14 through switch Q5 and the internal diode of switch Q6 as shown in FIG. 3b.

Figure 4A:
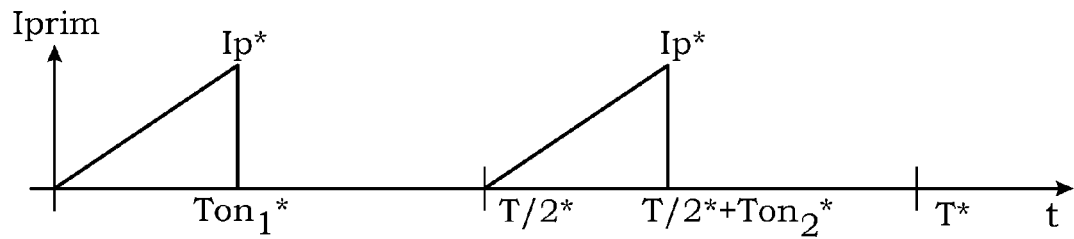
FIGS. 4a-4b are x-y graphical displays of an example of theoretical output current waveforms for the embodiment of FIG. 1 in flyback operating mode FL1.
Figure 4B:
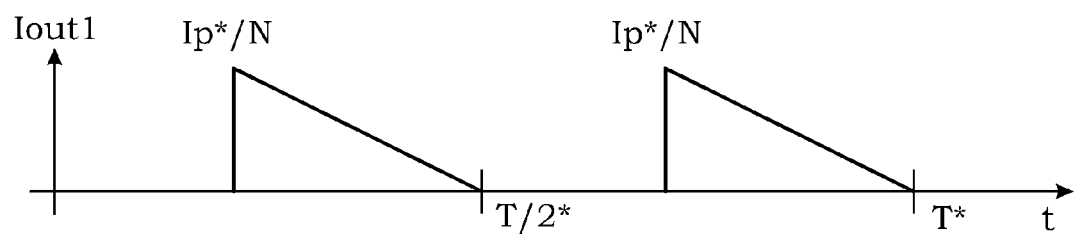

In various embodiments as shown for example in FIGS. 4a-4b, the two switch states just described may occur within the same half-period (T*/2) and repeat themselves to complete the predicted switching period (T*). The switching period T* consists of two half-periods in these cases for switching compatibility with the forward operating mode, which also includes two switching half-periods in many embodiments of the system.

Figure 5A:
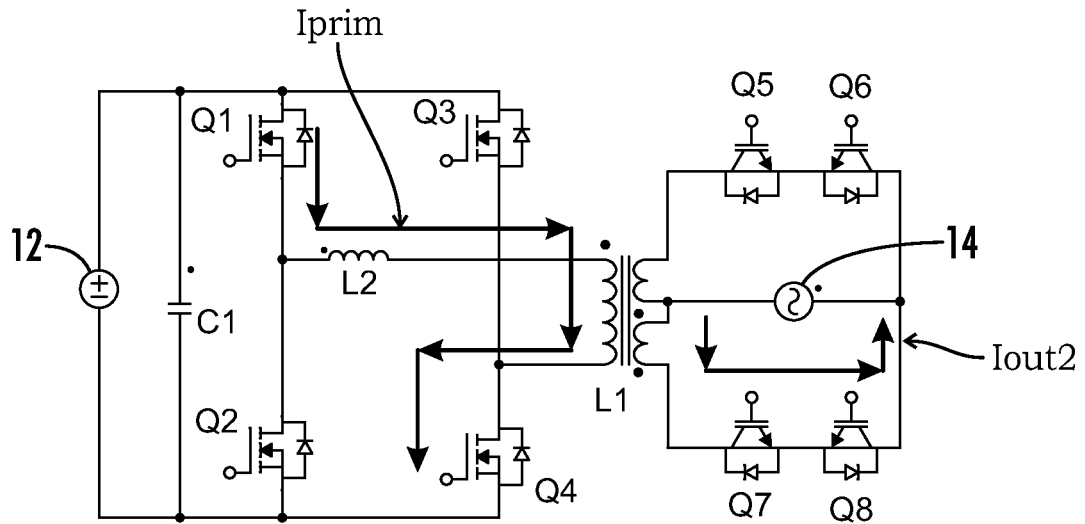
FIGS. 5a-5d are circuit schematics of the embodiment of FIG. 1 showing switch states and current flow in a forward operating mode FW1.

As soon as the predicted switching period (T*) has elapsed, which is intended to occur when the current on the first output path Iout1 has reached zero, the operating mode of the converter changes from flyback mode FL1 to forward mode FW1. The predictive feed-forward circuit 32 will have already determined based on detected signals from the AC grid 14 that the forward mode FW1 is approaching and calculated appropriate values Ip*, Ton1*, Ton2* and T* for this operating mode. The switch state is changed to Q1=Q4=ON, Q2=Q3=OFF, Q5=Q7=ON, Q6=Q8=OFF. In this state, the primary side current flows through switches Q1, Q4 and subsequently flows to the grid 14 through switch Q7 and the internal diode of switch Q8 as shown in FIG. 5a.

Figure 5B:
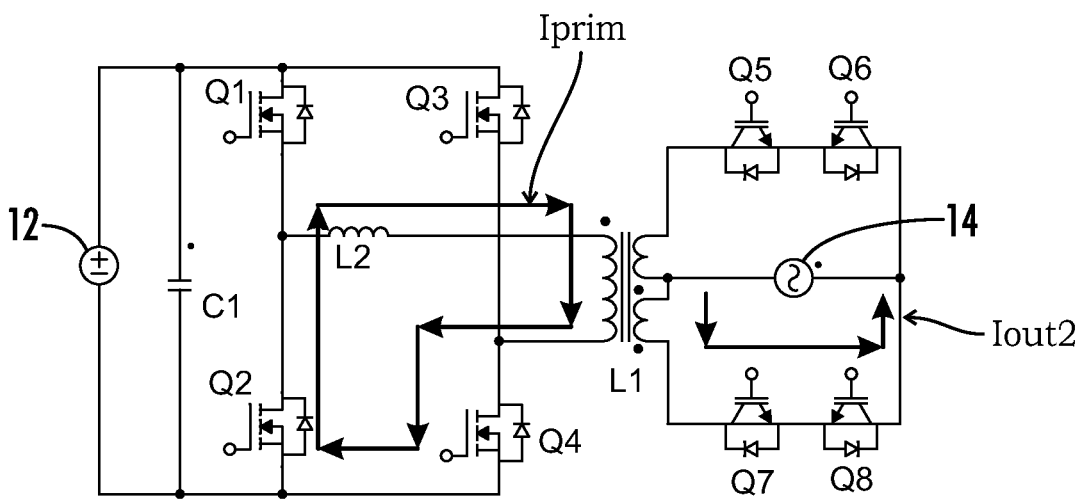

As soon as the predicted switch-on time (Ton1*) has been reached, which is intended to occur when the primary current charges up to its predicted peak value (Ip*), the switch state is changed to Q2=Q4=ON, Q1=Q3=OFF, Q5=Q7=ON, Q6=Q8=OFF. In this state, the stored primary side current flows through switches Q2, Q4 and flows to the grid 14 through switch Q7 and the internal diode of switch Q8 as shown in FIG. 5b.

Figure 5C:
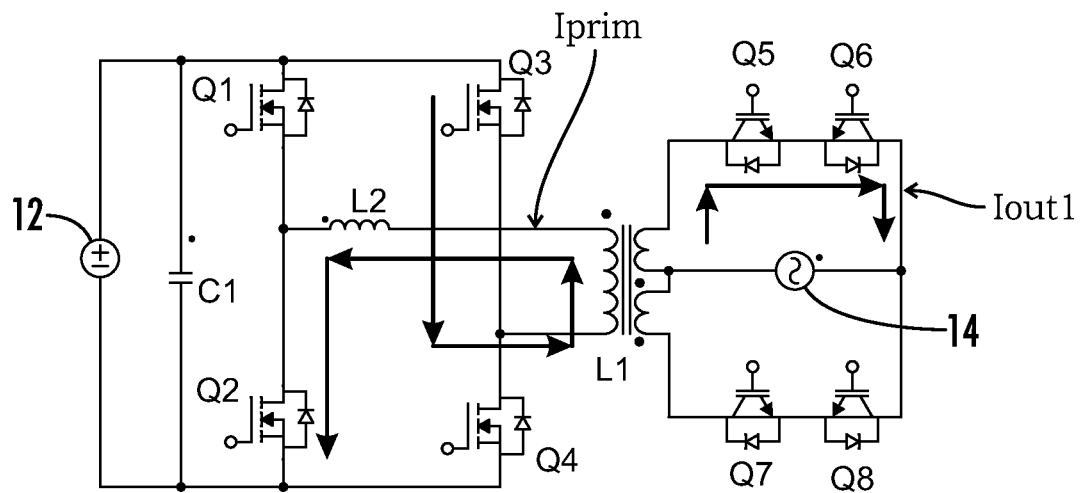

To avoid saturation of the transformer L1, the primary current direction may then be reversed. As soon as the switching half-period (T*/2) has elapsed, which is intended to occur when the primary current has discharged to zero, the switch state is changed to Q2=Q3=ON, Q1=Q4=OFF, Q5=Q7=ON, Q6=Q8=OFF. In this state, the primary side current flows through switches Q2, Q3 and flows to the grid 14 through switch Q5 and the internal diode of switch Q6 as shown in FIG. 5c.

Figure 5D:
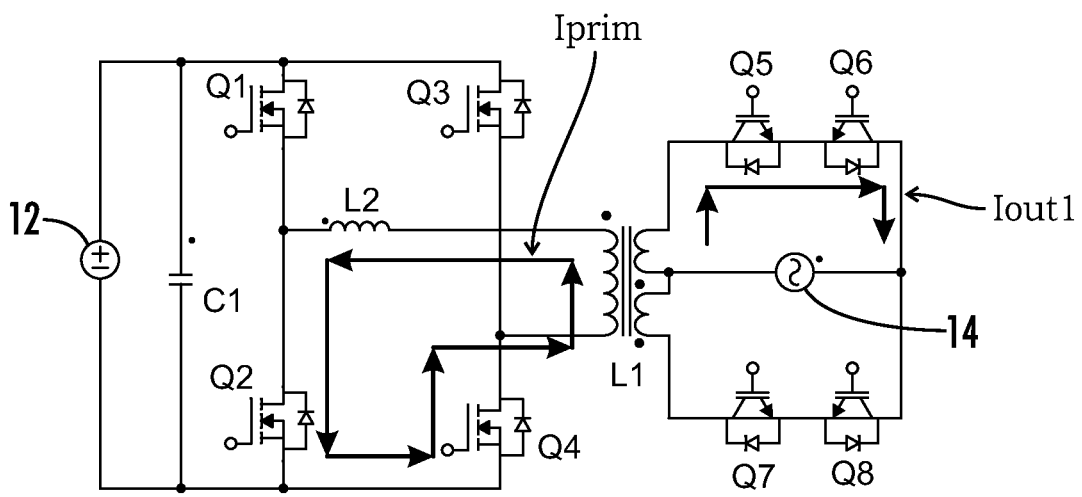

As soon as the predicted switch-on time (T*/2+Ton2*) has been reached, which is intended to occur when the primary current charges to its predicted peak value in the opposite flow direction (−Ip*), the switch state is changed to Q2=Q4=ON, Q1=Q3=OFF, Q5=Q7=ON, Q6=Q8=OFF. In this state, the stored primary side current flows through switches Q2, Q4 and flows to the grid 14 through switch Q5 and the internal diode of switch Q6 as shown in FIG. 5d.

As soon as the predicted switching period (T*) has elapsed, which is intended to occur when the current on the first output path Iout1 has reached zero, the operating mode of the converter changes from forward mode FW1 back to flyback mode FL1. As before, the predictive feed-forward circuit 32 will have already determined based on detected signals from the AC grid 14 that the flyback mode FL1 is approaching and calculated appropriate values Ip*, Ton*, T* for this operating mode. Also as before, the switch state is set to Q1=Q4=ON, Q2=Q3=OFF, Q5=ON, Q6=Q7=Q8=OFF, the primary side current flows through switches Q1, Q4 and the energy is stored in the primary side inductor L2 and the transformer L1 as shown in FIG. 3a. As soon as the predicted switch-on time (Ton*) has been reached, which is intended to occur when the primary current reaches its predicted peak value (Ip*), the switch state is changed to Q1=Q4=Q2=Q3=OFF, Q5=ON, Q6=Q7=Q8=OFF. The energy stored on the transformer L1 flows to the grid 14 through switch Q5 and the internal diode of switch Q6 as shown in FIG. 3b.

Figure 7A:
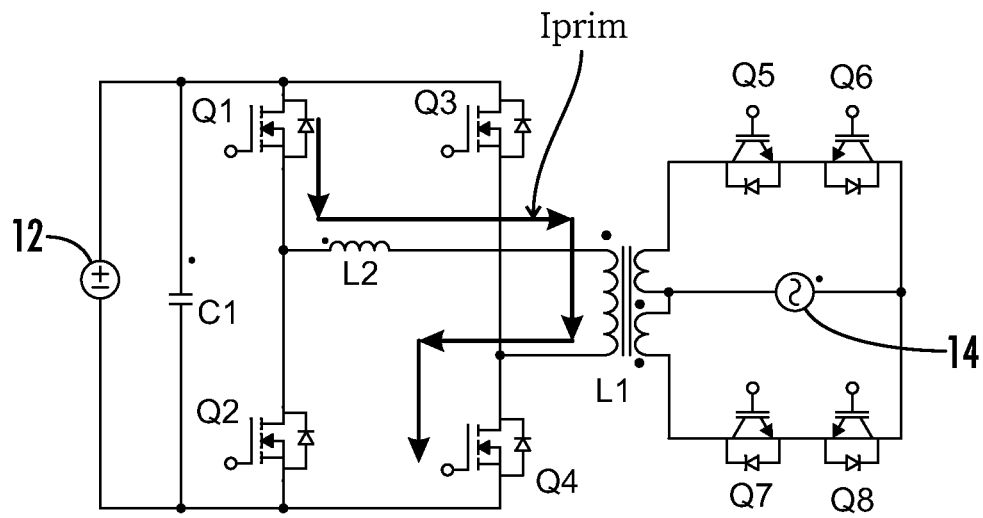
FIGS. 7a-7b are circuit schematics of the embodiment of FIG. 1 showing switch states and current flow in a flyback operating mode FL2.
Figure 7B:
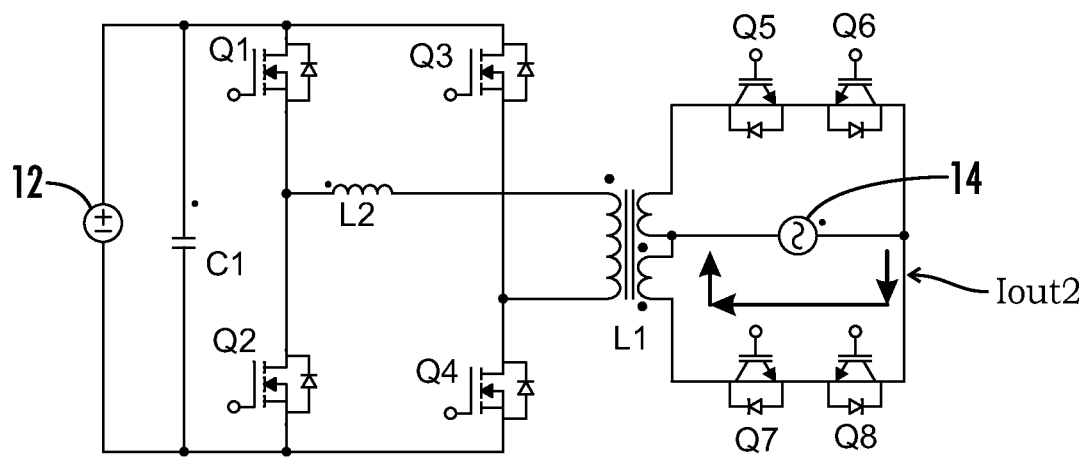

Upon reaching the switching half-period (T*/2), the sine-wave for the output current becomes negative as shown in FIG. 2, and the converter begins operating in flyback mode FL2. The switch state is initially changed to Q1=Q4=ON, Q2=Q3=OFF, Q8=ON, Q5=Q6=Q7=OFF, and then upon reaching the predicted on-time (Ton*), which is intended to occur when the primary current reaches its predicted peak value (Ip*), the switch state is changed to Q1=Q4=Q2=Q3=OFF, Q8=ON, Q5=Q6=Q7=OFF. As may be seen, the primary side works in exactly the same fashion as with flyback mode FL1, but the output switches Q5, Q8 are reversed, such that current flows to the grid through switch Q8 and the internal diode of switch Q7. This is because the grid voltage has changed its polarity and so the output current direction has to be reversed. The current paths are as shown in FIG. 7a-7b.

Figure 8A:
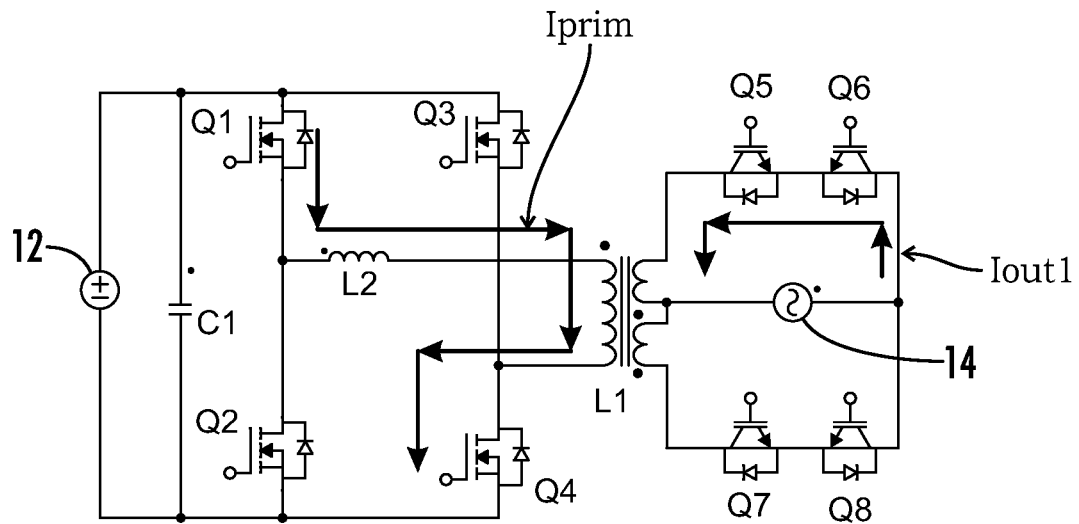
FIGS. 8a-8d are circuit schematics of the embodiment of FIG. 1 showing switch states and current in forward operating mode FW2.
Figure 8B:
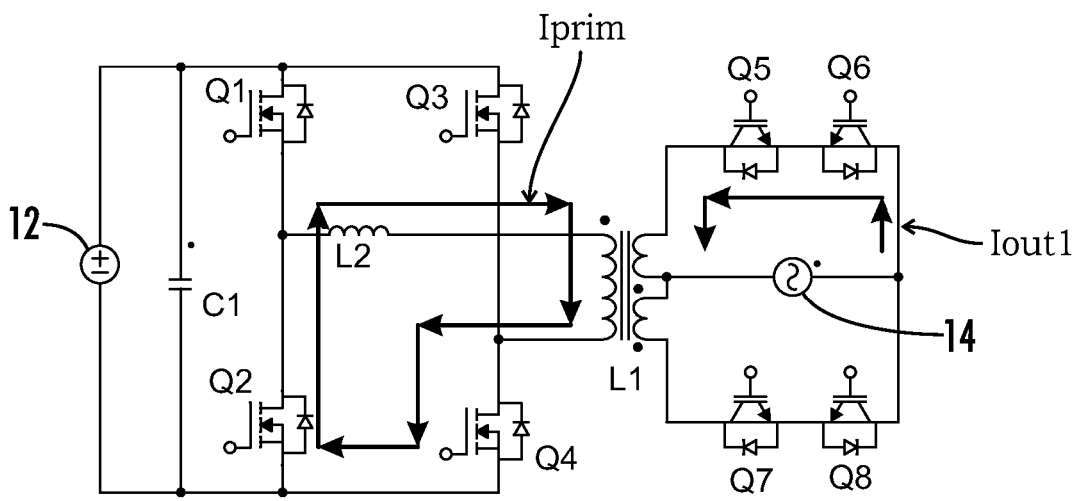
Figure 8C:
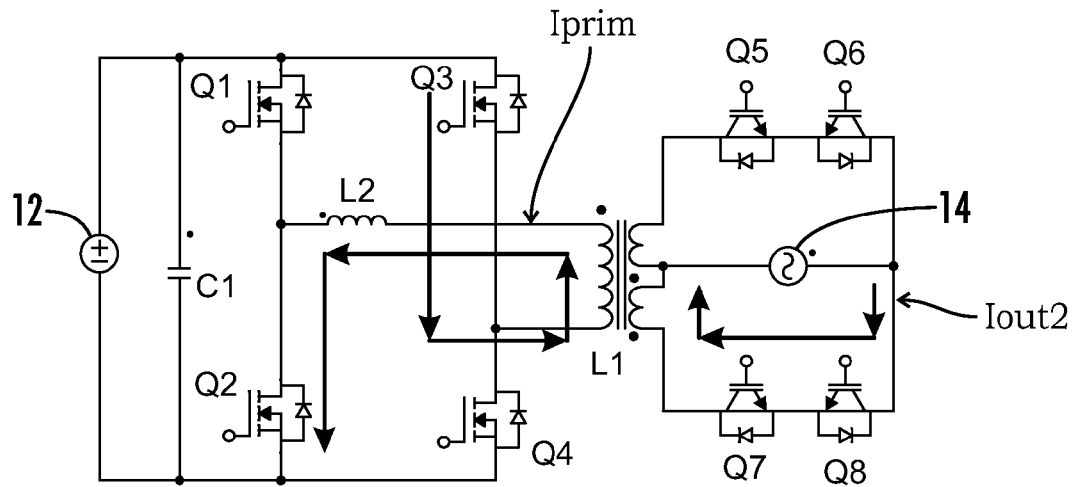
Figure 8D:
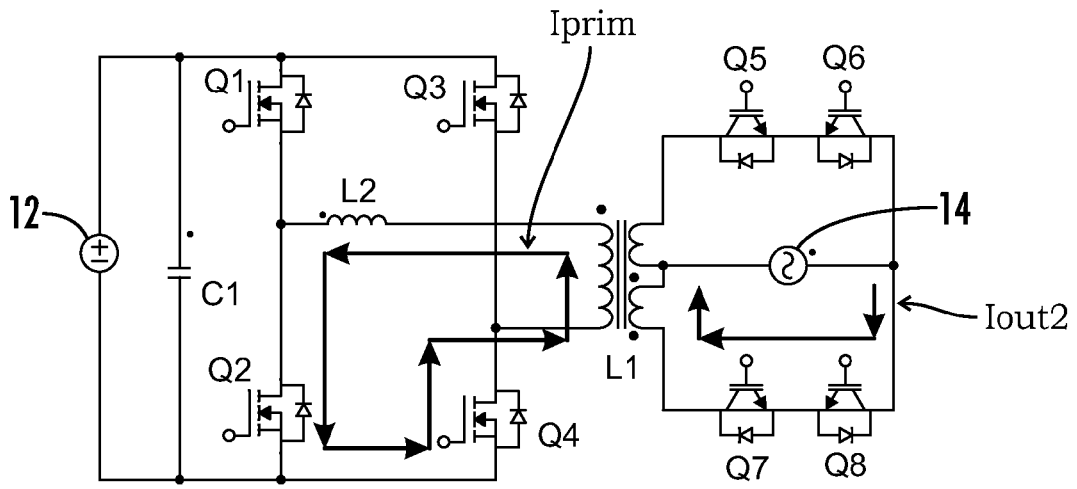

When the predicted switching period (T*) has elapsed, which is intended to occur when the current on the second output path Iout2 has reached zero, the operating mode of the converter changes again from flyback mode FL2 to forward mode FW2. In the forward mode FW2, the primary side 16 works in exactly the same manner as in the forward mode FW1. The status of the switches Q5-Q8 of the secondary circuit 22 is changed, however, to allow for reversed current flow. The switch status from (0, Ton1*) is Q1=Q4=ON, Q2=Q3=OFF, Q5=Q7=OFF, Q6=Q8=ON, and produces a current flow to the grid 14 as shown in FIG. 8a. The switch status from (Ton1*, T*/2) is Q2=Q4=ON, Q1=Q3=OFF, Q5=Q7=ON, Q6=Q8=OFF, and produces a current flow to the grid 14 as shown in FIG. 8b. The switch status from (T*/2, T*/2+Ton2*) is Q2=Q4=ON, Q1=Q3=OFF, Q5=Q7=ON, Q6=Q8=OFF, and produces a current flow to the grid 14 as shown in FIG. 8c. The switch status for the remainder of the switching period from (T*/2+Ton2, T*) is Q2=Q4=ON, Q1=Q3=OFF, Q5=Q7=ON, Q6=Q8=OFF, and produces a current flow to the grid 14 as shown in FIG. 8d.

As discussed above and shown in FIG. 9, based on the determined operating mode, the predictive circuit 32 calculates predicted values 34 including the required primary peak current (Ip*), the converter switch on-time (Ton*) and the switching period (T*). The control circuit 28 then may adjust the predicted values based on detected real-time circuit parameters 36 and provide adjusted control values 38 to the switches Q1-Q8 of the micro-inverter system 10.

The digital control strategy for various embodiments of the system and method of the present invention in flyback mode FL1 may now be discussed. During flyback mode FL1, the theoretical currents in transition mode for the primary side current (Iprim) and the output current across the first output path (Iout1) are as shown in FIGS. 4a, 4b, with predicted values designated as above and the transformer turns ratio designated as (N).

Figure 4C:
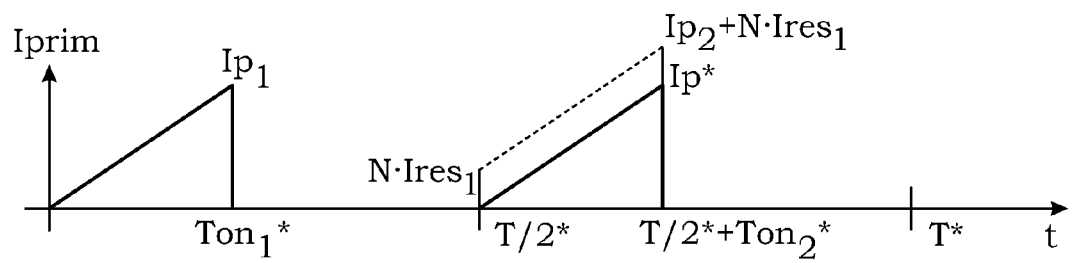
FIGS. 4c-4d are x-y graphical displays of an example of measured output current waveforms for the embodiment of FIG. 1 in flyback mode FL1.
Figure 4D:
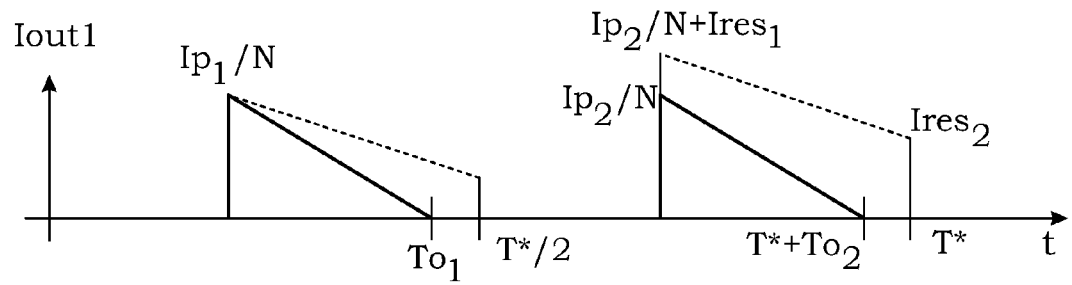

In reality it may be expected that component tolerances and quantization errors on calculations may result in the predicted values 34 differing to some extent from the actual measured values 36, as shown in FIGS. 4c, 4d. For example, the measured peak current (Ip) may be different than the predicted peak current (Ip*) required for proper shaping of the average output current. The output current Iout1 could reach the zero crossing before the predicted half-period (T*/2) as shown with the solid line at (To1). Alternatively, the output current Iout1 could reach the zero crossing after the predicted half-period (T*/2) as shown with the dotted line, resulting in a residual current Ires1. These errors may in fact compound themselves in the second half-period as shown with the premature zero crossing (T*+To2) and the residual current at T* (Ires2).

Similar current waveforms to those shown in FIGS. 4a-4d may be expected in the flyback FL2 operating mode, as may be understood by those of skill in the art.

In response to the measured values 36, the control circuit 28 may apply a closed-loop control algorithm to correct the predicted values 34 and assure the proper output current value Iout1 and transition mode. Referring again to FIG. 9, in an embodiment the control circuit 28 includes a digital regulator 40 to receive predicted values 34 from the predictive circuit 32, calculate adjusted values 38 and provide the adjusted values 38 to the switch signal generating circuit 30 for proper control of the switch states for the micro-inverter switches Q1-Q8.

Figure 10A:
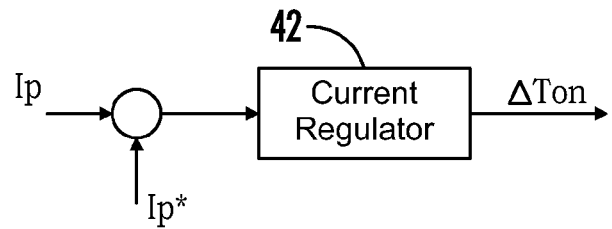
FIG. 10a is a block diagram of an embodiment of a current regulator associated with the controller of FIGS. 5a-d.

The digital regulator 40 in flyback operating modes FL1, FL2 may in certain embodiments include a current regulator 42 to adjust the switch on-time value (ΔTon) to obtain the proper peak primary current. An implementation of an embodiment of the current regulator 42 is shown in FIG. 10a.

Figure 10B:
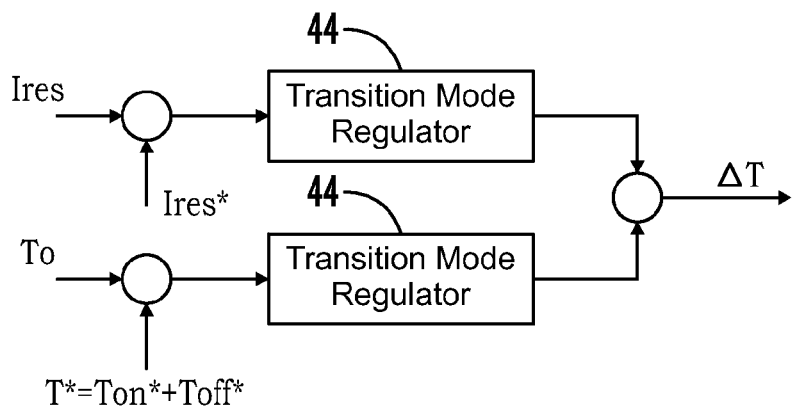
FIG. 10b is a block diagram of an embodiment of a transition mode regulator associated with the controller of FIGS. 5a-d.

The digital regulator 40 in flyback mode FL1, FL2 may in certain embodiments further include a transition mode regulator 44 to adjust the switching period (ΔT) in response to measured values, such as for example residual output current (Ires) or actual zero crossing of the output current waveform (To), and force the converter to operate at all times in transition mode. An implementation of an embodiment of the transition mode regulator 44 is as shown in FIG. 10b.

Figure 6A:
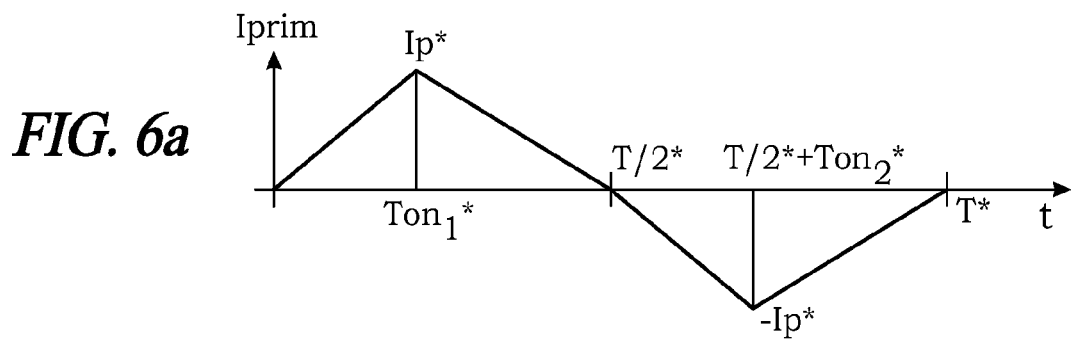
FIGS. 6a-6c are x-y graphical displays of an example of theoretical output current waveforms for the embodiment of FIG. 1 in a forward operating mode FW1.
Figure 6B:
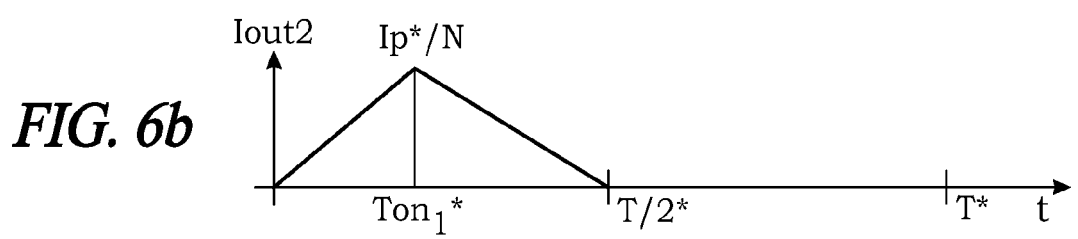
Figure 6C:
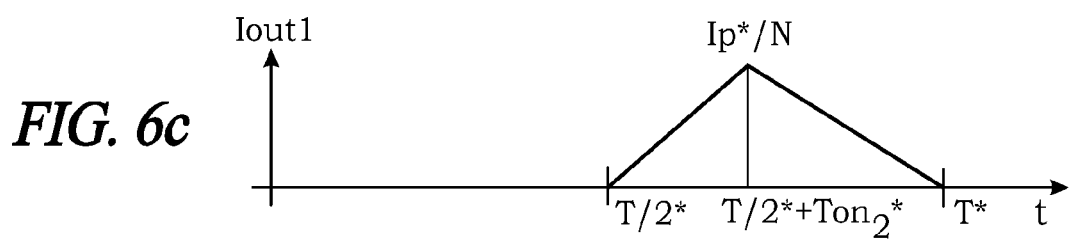

The digital control strategy for various embodiments of the system and method of the present invention in forward mode FW1 may now be discussed. During forward mode FL1 the theoretical currents in transition mode for the primary side current (Iprim) and the output currents across the first output path (Iout1) and second output path (Iout2) are as shown in FIGS. 6a, 6b, 6c, with predicted values Ip*, Ton1*, Ton2*, T* as previously discussed, and the transformer turns ratio designated as (N).

Figure 6D:
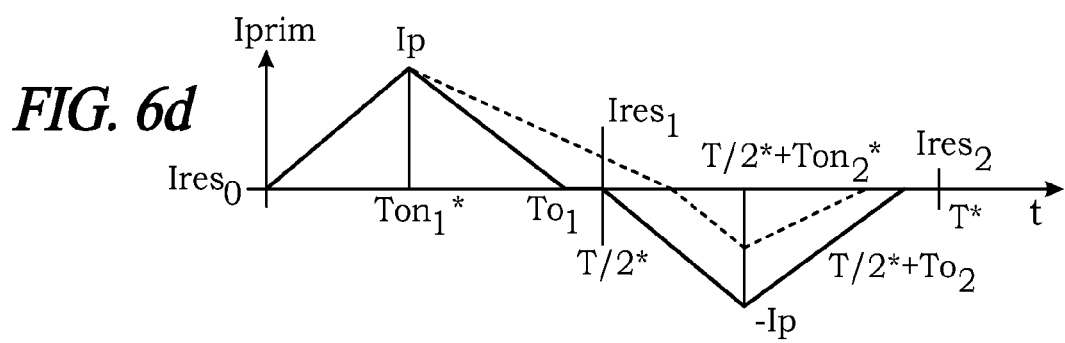
FIGS. 6d-6e are x-y graphical displays of an example of measured output current waveforms for the embodiment of FIG. 1 in a forward operating mode FW1.

In reality it may be expected that component tolerances and quantization errors on calculations may result in the predicted values 34 differing to some extent from the actual measured values 36, as shown in FIG. 6d. For example, the measured peak primary current (Ip) may be different than the predicted peak primary current (Ip*) required for proper shaping of the average output current. The output current could reach the zero crossing before the predicted half-period (T*/2) as shown with the solid line at (To1). Alternatively, the output current could reach the zero crossing after the predicted half-period (T*/2) as shown with the dotted line, resulting in a residual current Ires1. The output current could reach the zero crossing in (T*/2÷To2) before the predicted switching period T*. Finally, the output current could reach the zero crossing after the predicted time T*, resulting in a residual current Ires2.

Similar current waveforms to those shown in FIGS. 4a-4d may be expected in the flyback FL2 operating mode, as may be understood by those of skill in the art.

Figure 6E:
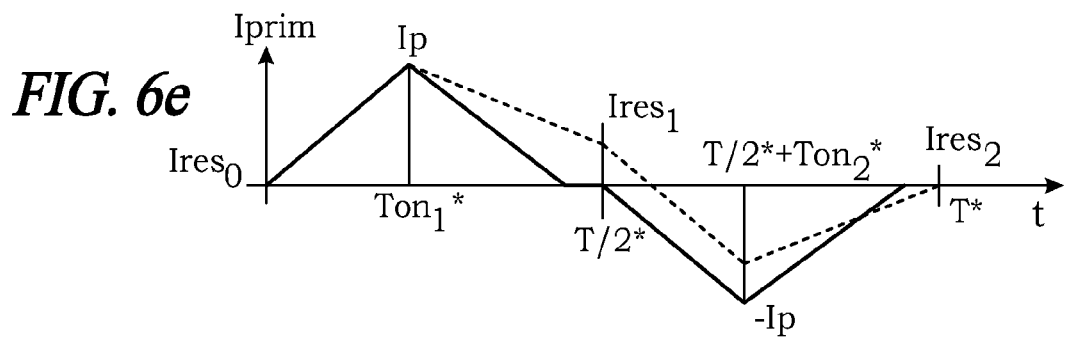

It may be noted that where a residual current is present, the average current across the transformer L1 is not zero. If the proper output switch is turned on during the rising phase of the current, such as for example during the intervals of (0, Ton1*) and (T*/2, T*/2+Ton2*), the primary side current may be as shown in FIG. 6e.

Where the switch on-times Ton1, Ton2, are equal, the current at T* (Ires2) will always be equal to the current at the start of the switching period (Ires0), and therefore if the converter starts from zero it will generally operate in transition mode at T*. The control algorithm seeks to recover this condition because otherwise the average output current is not as desired, where the switching at time T* is not carried out at zero current and the transformer L1 has a residual magnetic flux at T*.

With this desired condition in mind, and in response to the measured values 36, the control circuit 28 may apply a closed-loop control algorithm to correct the predicted values 34 and assure the proper output current value Iout1 and transition mode in a similar fashion as the flyback mode control algorithms. Again referring to FIG. 9, in an embodiment the control circuit 28 for the forward modes FW1, FW2 includes a digital regulator 40 to receive predicted values 34 from the predictive circuit 32, calculate adjusted values 38 and provide the adjusted values 38 to the switch signal generating circuit 30 for proper control of the switch states for the micro-inverter switches Q1-Q8.

Figure 11A:
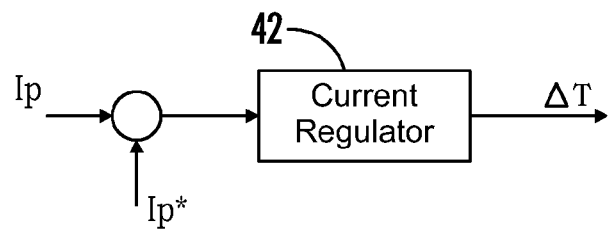
FIG. 11a is a block diagram of an embodiment of a current regulator associated with the controller of FIGS. 8a-d.

The digital regulator 40 in forward mode FW1, FW2 may in certain embodiments include a current regulator 42 to obtain the proper peak primary current by adjusting the switching period. An implementation of such an embodiment of the current regulator 42 is shown in FIG. 11a.

Figure 11B:
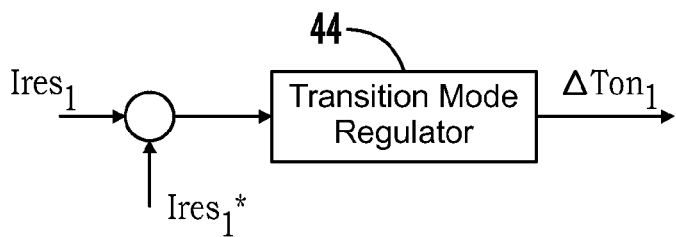
FIGS. 11b-11c are block diagrams of an embodiment of a transition mode regulator associated with the controller of FIGS. 8a-d.
Figure 11C:
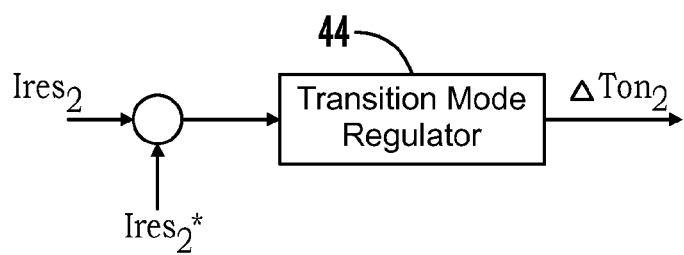

The digital regulator 40 in forward modes FW1, FW2 may in certain embodiments further include a transition mode regulator 44 to adjust the switch on-times (ΔTon1, ΔTon1) in response to measured values such as for example residual output current values (Ires1, Ires2) or to correct for premature zero crossings (To1, To2), and force the converter to operate at all times in transition mode. An implementation of an embodiment of the transition mode regulator 44 is as shown in FIGS. 11b, 11c. The residual output current values (Ires1, Ires2) are input along with predicted/desired residual output current values (Ires1*, Ires2*).

The implementations shown in FIGS. 10a-11c are merely an example of one way to adjust switching parameters, and it may be understood that in various embodiments the regulators may control for a variety of parameter combinations to obtain a desired output waveform within the scope of the present invention.

Figure 13:
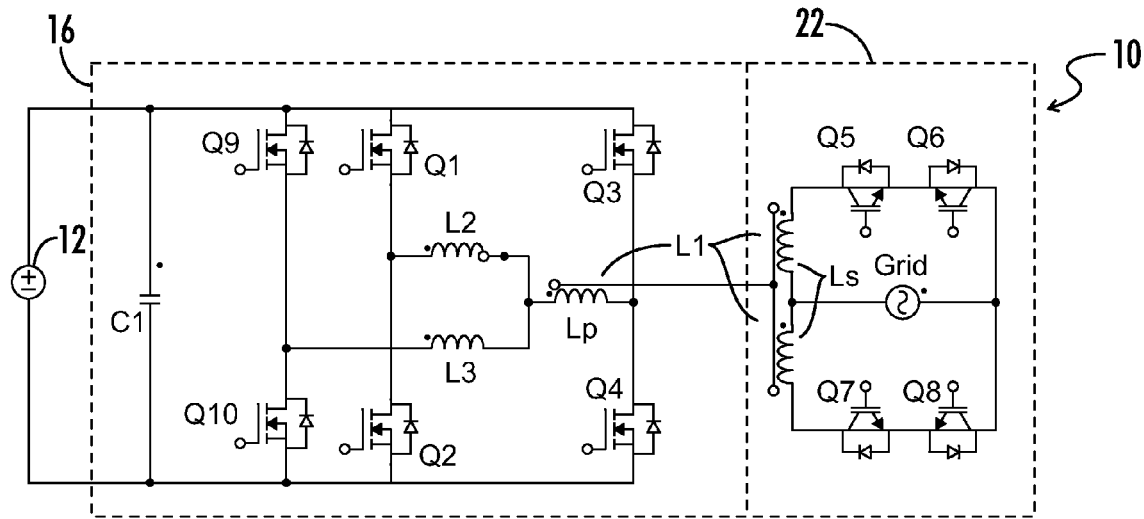
FIG. 13 is a circuit schematic of another embodiment of the present invention.

Referring now to FIG. 13, in another embodiment of the present invention a converter topology is provided with an input stage 16 having a third set of switches Q9, Q10 with integrated diodes coupled in parallel with the first set of switches Q1, Q2 with respect to a previously described embodiment and as shown in FIG. 1, with an inductor L3 having a first end coupled between the third pair of switches Q9, Q10 and a second end coupled between the inductor L2 and a first end of the primary winding Lp of the isolation transformer L1. The structure of an embodiment as shown in FIG. 13 is otherwise substantially the same as the structure shown in FIG. 1. However, the converter of FIG. 13 may be configured to alternate only between first and second Forward modes FW1, FW2 rather than include Flyback operating modes, as described below.

The converter as shown in FIG. 13 operates as the equivalent of two independent converters that supply the same isolation transformer. The first converter includes switches Q1, Q2, Q3, Q4, inductor L2 and the transformer L1. The second converter includes switches Q9, Q10, Q3, Q4, inductor L3 and the transformer L1. The L3 inductor value is larger than that of the L2 inductor. The values of the inductors L2, L3 when taken in parallel may be equal to the selected inductor value of the H-bridge configuration of FIG. 1.

While the converter operates in forward mode in this configuration, the determination of which switching elements that are utilized by the converter is dependent upon the load. At low load, the controller may be configured to drive the third set of switches Q9, Q10 and the second set of switches Q3, Q4 but not the second pair of switches Q1, Q2, such that the inductor L3 is used to supply the transformer L1 but not the inductor L2. The converter in this configuration maintains an H-bridge topology and operates in Forward mode substantially the same as in the embodiment of FIG. 1, with equivalent current waveforms and control techniques. Having a larger inductor L3 in this case may reduce the operative frequency and boost converter efficiency.

At intermediate load, the controller may be configured to drive the first set of switches Q1, Q2 and the second set of switches Q3, Q4 but not the third pair of switches Q9, Q10, such that the inductor L2 is used to supply the transformer L1 but not the inductor L3.

At high load, the controller may be configured to drive switches Q1 and Q9 at the same time, and further to drive switches Q2 and Q10 at the same time, otherwise using the same control technique as with low and intermediate loads. Inductors L2, L3 work in parallel and together supply the transformer L1 with an inductance having the same value as that of the single inductor L2 as shown in FIG. 1.

Referring now to FIGS. 14-19, alternative embodiments may be described of a converter topology for operating in Forward mode only and within the scope of the present invention, with the primary stage 16 configured substantially the same as that shown in FIG. 1. Various alternative configurations for the output/secondary stage 22 are provided, although without substantially modifying the working principle or the input and output waveforms with respect to the embodiment of FIG. 1. The output stage 22 in various embodiments may provide circuitry to independently carry out the high frequency rectification and inversion functions that are otherwise mixed in the same circuitry in the embodiment of FIG. 1.

Figure 14:
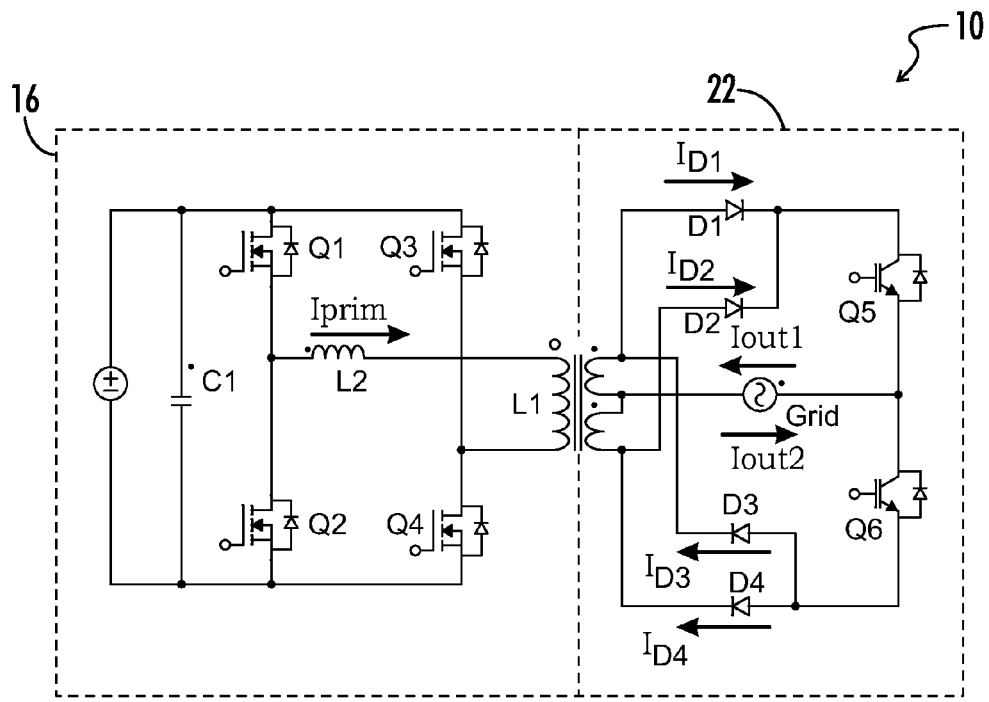
FIG. 14 is a circuit schematic of another embodiment of the present invention.
Figure 15A:
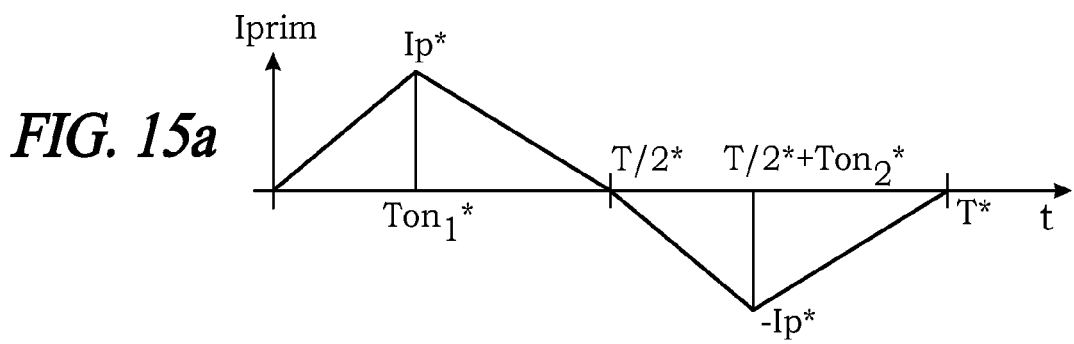
FIGS. 15a-15d are graphical representations of measured current waveforms for current flow in the embodiment of FIG. 14 during a forward operating mode.
Figure 15B:
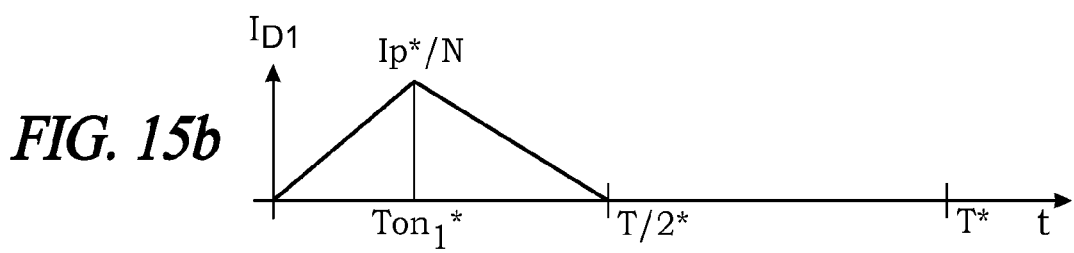
Figure 15C:
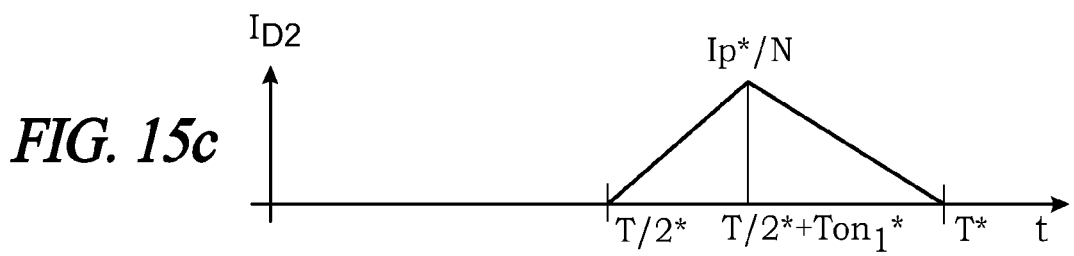
Figure 15D:
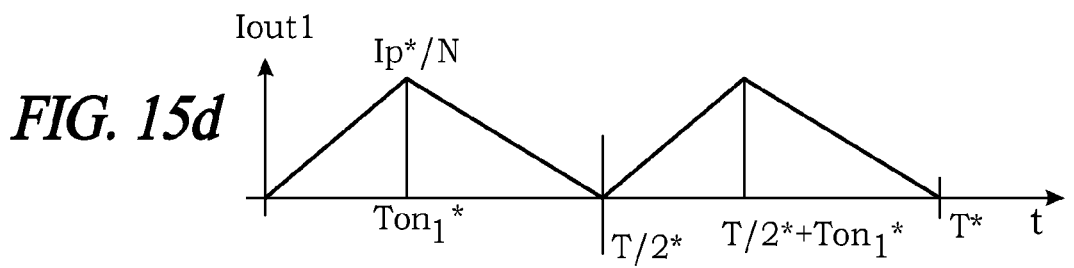

In an embodiment as shown in FIG. 14, the output stage 22 includes a pair of switches Q5, Q6 coupled across the secondary winding Ts of the isolation transformer L1. The AC grid 14 is coupled on a first end to a center tap of the secondary winding Ls and coupled on a second end to a node between the switches Q5, Q6. A first diode D1 is coupled between a first end of the secondary winding Ls and switch Q5, and a second diode D2 is coupled between a second end of the secondary winding Ls and switch Q5. A third diode D3 is coupled between the first end of the secondary winding Ls and switch Q6, and a fourth diode D4 is coupled between the second end of the secondary winding Ls and switch Q6.

This topology arrangement uses the four diodes D1-D4 for the high frequency rectification and the two switches Q5, Q6 for the inversion. The operating modes for the converter are determined based on the detected input and output signals and may be described with reference to FIG. 12. During the FW1 operating mode the output current is directed through switch Q5 and either of diodes D1 or D2, depending on the direction of the current Iprim across the primary winding Lp of the transformer L1. During the FW2 operating mode the output current is directed through switch Q6 and either of diodes D3 or D4, depending on the direction of the primary current Iprim.

FIGS. 15a-d graphically illustrate current waveforms for current flow across the primary winding Iprim, the first diode ID1, the second diode ID2 and the AC grid output Iout1, respectively, during operating mode FW1. The principles of operation are the same during FW2 with respect to the third and fourth diodes D3, D4 and the AC grid output Iout2, and are not shown as being redundant.

Figure 16:
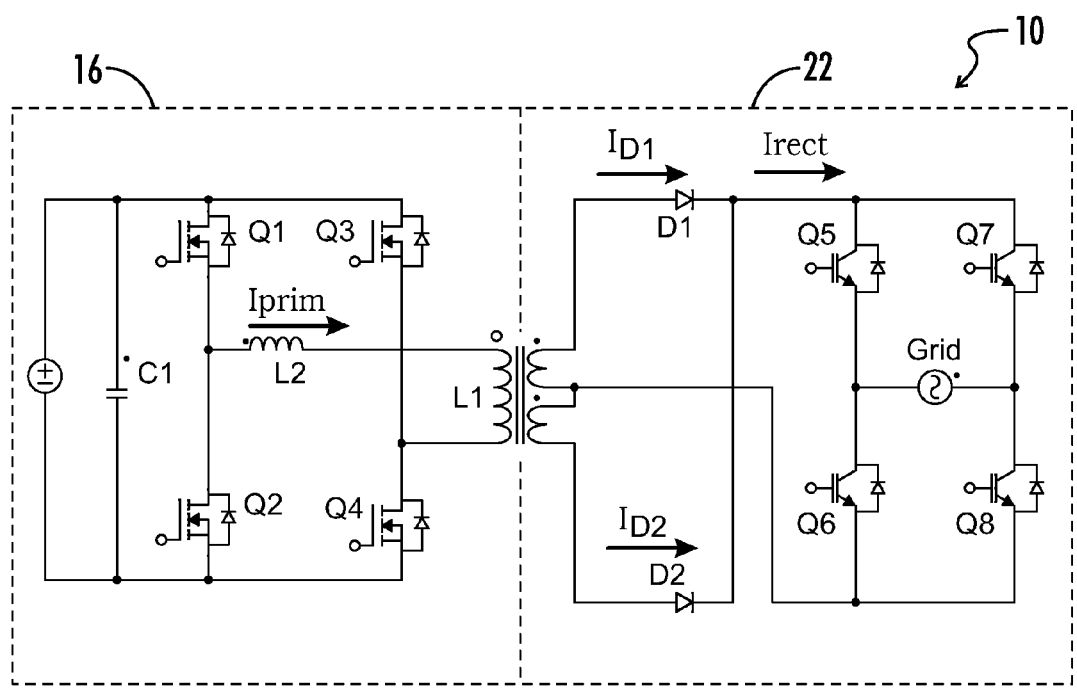
FIG. 16 is a circuit schematic of another embodiment of the present invention.
Figure 17A:
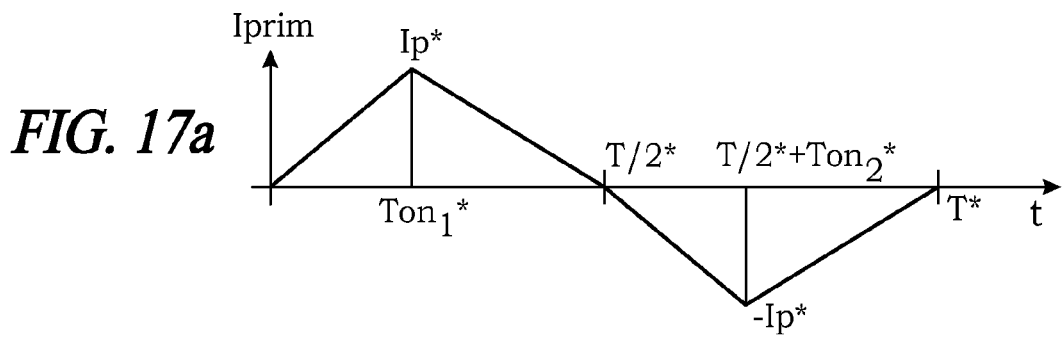
FIGS. 17a-17d are graphical representations of current waveforms for current flow in the embodiment of FIG. 16.
Figure 17B:
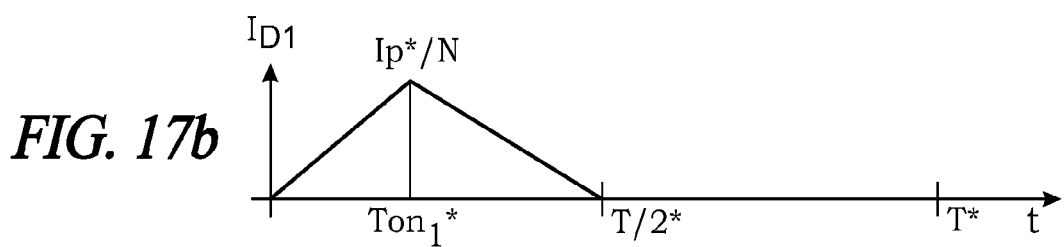
Figure 17C:
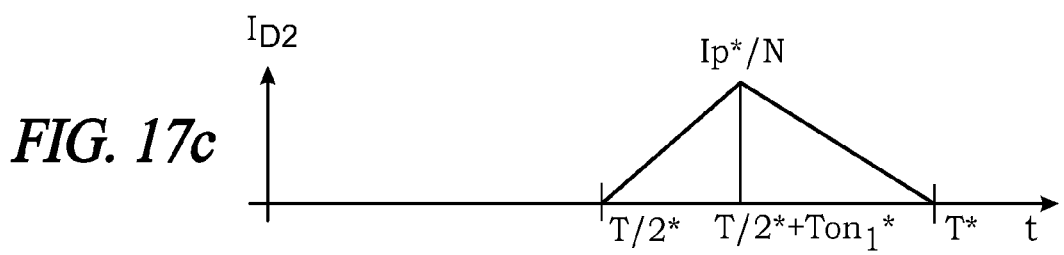
Figure 17D:
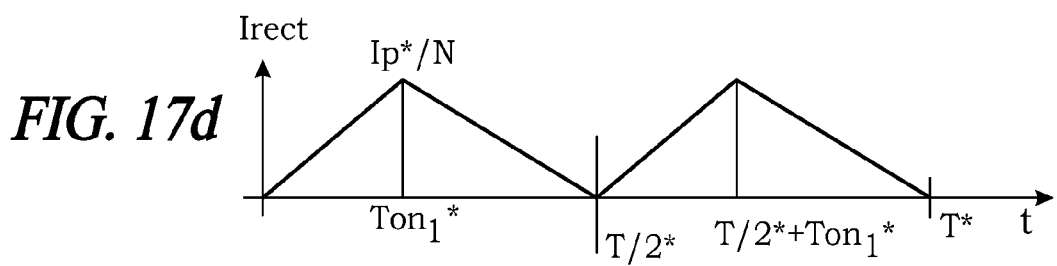

In an embodiment as shown in FIG. 16, the output stage 22 includes a series-coupled pair of switches Q5, Q6 coupled on a first end to a first end of the secondary winding Ts of the isolation transformer L1, and coupled on a second end to a center tap of the secondary winding Ls. Another series-coupled pair of switches Q7, Q8 is coupled in parallel with the switches Q5, Q6. The AC grid 14 is coupled on a first end to a node between the switches Q5, Q6 and coupled on a second end to a node between the switches Q7, Q8. A first diode D1 is coupled between a first end of the secondary winding Ls and switch Q5, and a second diode D2 is coupled between a second end of the secondary winding Ls and the switch Q5.

This topology arrangement uses the two diodes D1-D2 for the high frequency rectification and the four switches Q5-Q8 for the inversion. The operating modes are determined based on the detected input and output signals and may be described with reference to FIG. 12. During the FW1 and FW2 operating modes the output current is directed through either of diodes D1 or D2, depending on the direction of the current Iprim across the primary winding Lp of the transformer L1. In either case a current Irect results, and is directed across the switches in a manner consistent with the Forward mode operation described with reference to the embodiment of FIG. 1.

FIGS. 17a-d graphically illustrate current waveforms for current flow across the primary winding Iprim, the first diode ID1, the second diode ID2 and the AC grid output Irect, respectively.

Figure 18:
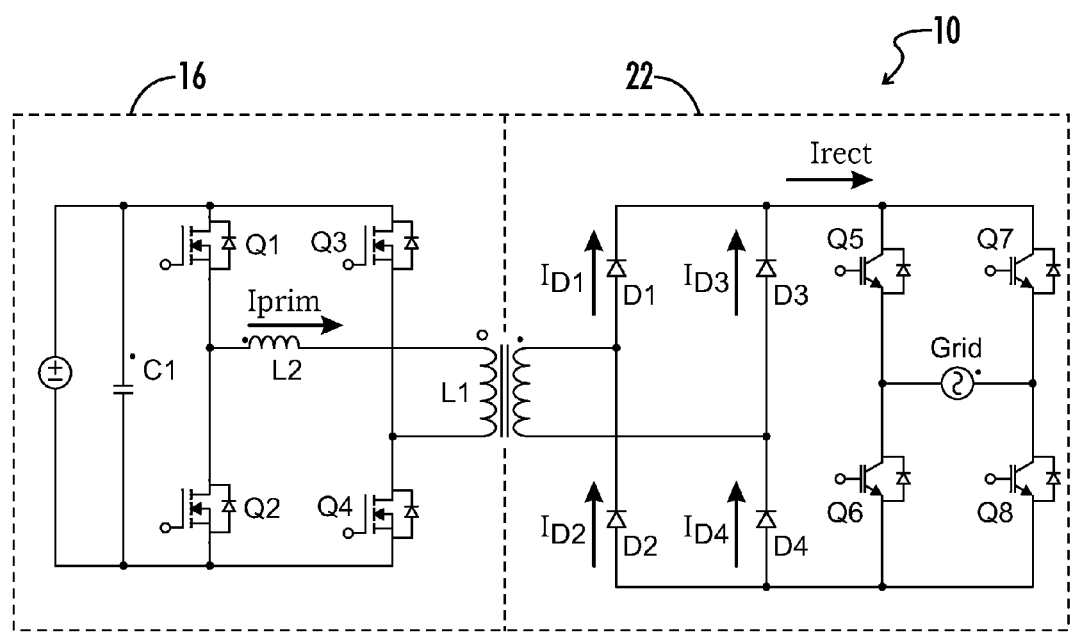
FIG. 18 is a circuit schematic of another embodiment of the present invention.
Figure 19A:
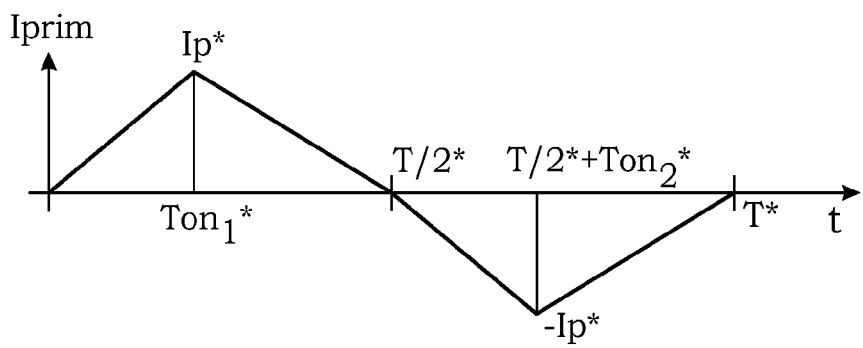
FIGS. 19a-19d are graphical representations of current waveforms for current flow in the embodiment of FIG. 18.
Figure 19B:
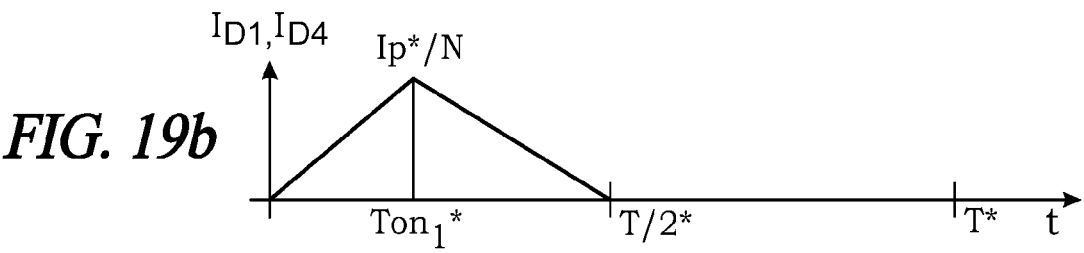
Figure 19C:
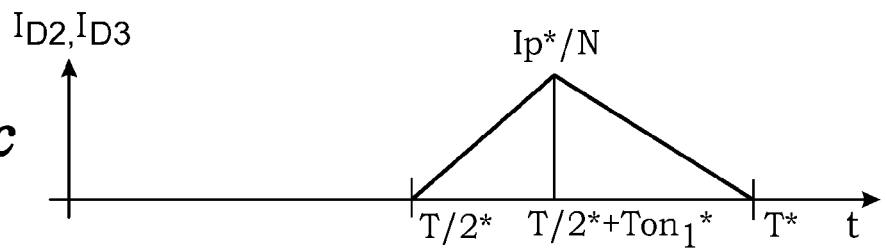
Figure 19D:
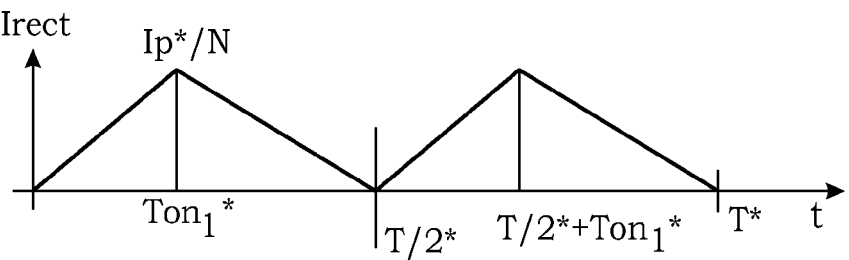

In an embodiment as shown in FIG. 18, the output stage 22 includes a secondary winding Ts of the transformer T1 that does not include a center tap. A first pair of diodes D1, D2 and a second pair of diodes D3, D4 are coupled in parallel to the transformer T1 in a full bridge configuration to perform the high frequency rectification. A first pair of switches Q5, Q6 is coupled across the output of the diode bridge D1-D4. A second pair of switches Q7, Q8 is coupled in parallel with the first pair of switches Q5, Q6. The AC grid 14 is coupled on a first end between the switches Q5, Q6 and on a second end between the switches Q7, Q8.

The operating modes for the converter are determined based on the detected input and output signals and may be described with reference to FIG. 12. During the FW1 and FW2 operating modes the output current is directed through either of the first pair of diodes D1, D2 or the second pair of diodes D3, D4, depending on the direction of the current Iprim across the primary winding Lp of the transformer L1. In either case a current Irect results, and is directed across the switches in a manner consistent with the Forward mode operation described with reference to the embodiment of FIG. 1.

FIGS. 19a-d graphically illustrate current waveforms for current flow across the primary winding Iprim, a diode ID1 or ID4, a diode ID2 or ID3, and the AC grid output Irect, respectively.

In accordance with features of the present invention as disclosed, an embodiment of the present invention includes a method of converting solar energy. A first step includes providing an isolation transformer with an input stage including a primary winding coupled to a solar panel providing a DC input signal, and an output stage including a secondary winding coupled to an AC load. A second step includes providing a first plurality of switches in the input stage coupled between the primary winding and the solar panel, and further providing a second plurality of switches in the output stage coupled to the secondary winding and to the AC load. In various embodiments, one or more of the second plurality of switches may be coupled between the secondary winding and the AC load. In other embodiments the AC load may be coupled, for example, directly to a center tap on the secondary winding while the second plurality of switches is coupled to first and second ends of the secondary winding. In either case, the output stage is configured to rectify and shape through polarity inversion the current provided across the secondary winding of the transformer to provide an average AC output current having a desired waveform configuration across the AC load.

A third step of the method includes sensing in real time the DC input signal from the solar panel and the AC output signal across the AC load.

A fourth step includes calculating a plurality of nominal converter switching parameters. The nominal switching parameters may include a predicted peak signal across the primary winding of the isolation transformer, a switch on-time and a switching period. The nominal switching parameters may be selected in accordance with the desired shape of the output current waveform. In various embodiments the desired waveform configuration is a sinusoidal current that is phase-locked in accordance with an AC grid.

A fifth step includes generating control signals to adjust switching states of the first plurality of converter switches to shape the current across the primary winding. The control signals may be generated based on at least one of the nominal converter switching parameters and a converter operating mode associated with the sensed DC input signal.

In an embodiment of the fifth step, the converter alternates between a flyback operating mode and a forward operating mode. The converter may be configured at normal loads to operate in a flyback mode when the DC input signal provides an output signal below a particular threshold, and configured to operate in a forward mode when the output signal is above a particular threshold. Alternatively, the converter may operate in flyback mode exclusively for low loads. In certain embodiments, control signals may be generated to control switch states of four switches on the primary side in an H-bridge configuration and shape the primary current, and control signals may be further generated to control switch states of four switches in two output current paths and thereby shape the current path of the average output current to the grid, all in accordance with the operating mode of the converter and the nominal switching parameters.

In alternative embodiments of the fifth step, the converter operates in forward mode only.

A sixth step includes generating control signals to adjust switching states of the second plurality of converter switches to shape the average output current. These control signals may also be generated based on at least one of the nominal converter switching parameters and the converter operating mode determined in the previous steps.

In various embodiments, the method may include the step of sensing a real-time primary signal across the primary winding of the isolation transformer. This step may in certain embodiments include detecting a residual primary current or a premature zero crossing of the primary current, either of which may be the difference between a predicted zero crossing for the current across the primary winding and a real-time zero crossing for the primary current.

In various embodiments, the method may further include the step of adjusting one or more of the converter switching parameters based on at least the sensed primary signal. For example, the predicted switch on-time or predicted switching period based on the measured AC output may be adjusted to correct variance between predicted values such as the peak primary signal and the switching period, and detected real-time measurements. The adjusted parameters are then supplied to the converter and the step of generating control signals for the switching states is carried out in subsequent iterations of the method using the adjusted parameters. A closed-loop control algorithm may be utilized in this manner to better shape the primary signal and thereby provide an average output current having a sinusoidal waveform to the grid.

The previous detailed description has been provided for the purposes of illustration and description. Thus, although there have been described particular embodiments of the present invention of a new and useful "Micro-Inverter with H-Bridge Topology Combining Flyback and Forward Operating Modes," it is not intended that such references be construed as limitations upon the scope of this invention except as set forth in the following claims.

What is claimed is:

1. A solar energy converter comprising:
a transformer having a primary winding and a secondary winding;
a first plurality of switching elements coupled to the primary winding of the transformer and configured for coupling to a photovoltaic solar panel;
a second plurality of switching elements coupled to the secondary winding of the transformer; and
a digital controller coupled to the switching elements and having an input for receiving a DC input signal from the solar panel, the controller functional to determine an operating mode for the converter based on the DC input signal from the solar panel, the controller further comprising a switch signal generator circuit operable to adjust switch states of the switches, the switch state adjustments based on
the operating mode,
at least one of a plurality of real time converter parameters, the real time converter parameters further comprising the DC input signal, an AC signal for output to a grid, and a current in the primary winding, and
a desired configuration for the AC output signal waveform;
the controller further comprising a predictive circuit functional to calculate predicted converter parameters further comprising a required peak primary current, a converter on time and a converter switching period, the calculations based on at least one of the real time converter parameters;

the controller further comprising a current regulator coupled to receive predicted parameters from the predictive circuit and functional to adjust the converter switch on-time based on the real time peak primary current;

the controller further comprising a transition mode regulator coupled to receive predicted parameters from the predictive circuit and functional to adjust the switching period based on a residual primary current, the residual current further comprising a difference between a predicted zero crossing for the primary current and a real time zero crossing for the primary current.

2. The converter of claim 1, wherein the converter is functional to alternate between a forward operating mode when the DC input signal is high, and a flyback operating mode when the DC input signal is low.

3. The converter of claim 1, wherein the converter is configurable to operate in either one of a flyback operating mode or a forward operating mode.

4. The converter of claim 1, the converter having a primary side further comprising the first plurality of switching elements having an H-bridge configuration including first and second switching elements coupled in series at a first node and third and fourth switching elements coupled in series at a second node, an inductor having a first end coupled to the first node having a second end coupled to a first end of the primary winding, the second end of the primary winding coupled to the second node.

5. The converter of claim 4, the converter having a secondary side further comprising:
fifth and sixth series-connected switching elements;
series-connected seventh and eighth switching elements;
a first end of the secondary winding coupled to a first output current path that includes the fifth and sixth switching elements;
a second end of the secondary winding coupled to a second output current path that includes the seventh and eighth switching elements;
the secondary winding having a center tap coupled to a third output current path comprising an output current of the converter for providing to a grid; and
the three output current paths further coupled to a third node.

6. The converter of claim 5, the primary side further comprising ninth and tenth switching elements coupled in parallel with the first and second switching elements, and a second inductor having a first end coupled to a first node between the ninth and tenth switching elements and having a second end coupled to the first end of the primary winding.

7. The converter of claim 4, the converter having a secondary side further comprising:
fifth and sixth switching elements coupled across the secondary winding of the transformer;
the secondary winding having a center tap;
a first output path coupled on a first end to the center tap of the secondary winding and coupled on a second end to a node between the switching elements, the first output path further including the converter output to the grid;
first and second diodes coupled between the secondary winding and the fifth switching element along a second output path; and
third and fourth diodes coupled between the secondary winding and the sixth switching element along a third output path, wherein the first, second and third output paths are coupled to a common node.

8. The converter of claim 4, the converter having a secondary side further comprising:

first and second pairs of switching elements, each pair coupled in parallel with the other;
an output current path coupled on a first end between the first pair of switching elements and coupled on a second end between the second pair of switching elements;
first and second diodes coupled between first and second ends, respectively, of the secondary winding and a first end of the first and second pairs of switching elements; and
the secondary winding of the transformer having a center tap coupled to a second end of the first and second pairs of switching elements.

9. The converter of claim 4, the converter having a secondary side further comprising:
first and second pairs of switching elements, each pair coupled in parallel with the other;
an output current path coupled on a first end between the first pair of switching elements and coupled on a second end between the second pair of switching elements;
first and second diodes coupled between first and second ends, respectively, of the secondary winding and a first end of the first and second pairs of switching elements; and
third and fourth diodes coupled between the first and second ends, respectively, of the secondary winding and a second end of the first and second pairs of switching elements.

10. A method for converting solar energy, the method comprising:
providing an isolation transformer having a primary winding coupled to a solar panel and a secondary winding coupled to an AC load;
providing a first plurality of converter switches coupled between the primary winding and the solar panel in an H-bridge configuration, and further providing a second plurality of converter switches coupled to the secondary winding and the AC load;
sensing a DC input signal from the solar panel and an AC output signal across the AC load;
calculating a plurality of nominal converter switching parameters;
generating control signals for adjusting switching states of the first plurality of converter switches based on at least one of the nominal converter switching parameters and a converter operating mode associated with the sensed DC input signal, wherein a current through the primary winding is generated;
generating control signals for adjusting switching states of the second plurality of converter switches based on at least one of the nominal converter switching parameters and the converter operating mode, wherein the AC output signal is generated with a desired waveform;
sensing the generated current through the primary winding; and
adjusting one or more of the converter switching parameters based on at least the sensed primary current;
the nominal converter switching parameters further comprising a predicted peak primary current, a switch on-time, and a switching period;
the step of sensing a primary signal further comprising detecting a residual primary current, the residual primary current comprising a difference between a predicted zero crossing for a current through the primary winding and a sensed zero crossing for the primary current;
the step of adjusting one or more of the converter switching parameters based on at least the sensed AC primary signal further comprising adjusting the switching period in accordance with the detected residual current.

11. The method of claim 10, the converter functional to operate in a flyback mode when the DC input signal is below a particular threshold, and the converter functional to operate in a forward mode when the DC input signal is above a particular threshold.

12. The method of claim 10, the converter functional to operate in a forward mode only.

13. The method of claim 10, the step of adjusting one or more of the converter switching parameters based on at least the sensed AC primary signal further comprising adjusting the switching period in accordance with the detected residual current.

14. The method of claim 10, the step of sensing an AC primary signal further comprising detecting a peak primary current.

15. The method of claim 14, the step of adjusting one or more of the converter switching parameters based on at least the sensed AC primary signal further comprising adjusting switch on-time in accordance with the detected peak primary current.

16. A micro-inverter system comprising:
an isolation transformer having a primary winding and a secondary winding;
a primary circuit coupled on a first end to a DC input source and further coupled on a second end to the primary winding, the primary circuit comprising a plurality of switches in an H-bridge configuration;
a secondary circuit coupled to the secondary winding and further coupled to an AC load, the secondary circuit comprising a plurality of switches functional for shaping an AC output current to the AC load;
a feed-forward circuit programmed to calculate a switching period, a switch on-time and a predicted peak current in the primary winding for the switching period; and
a switch control circuit programmed to adjust switch states of the plurality of switches in both of the primary and secondary circuits, the switch states selected in accordance with an operating mode further associated with an amplitude of a DC input signal from the DC energy source, the switch states adjusted in accordance with the switching period and the peak primary winding current;
wherein the switching period, switch on-time and predicted peak primary current are calculated in accordance with a desired sinusoidal shape of an output current waveform to the AC load;
further comprising a digital regulator circuit functional to adjust the calculated switching period, switch on-time and predicted peak primary current in accordance with sensed signals from the primary and secondary circuits;
the digital regulator circuit further comprising a current regulator functional to adjust the on-time in accordance with a difference between the predicted peak primary current and a sensed peak primary current;
the digital regulator circuit further comprising a transition mode regulator functional to adjust the switching period in accordance with a difference between a predicted zero crossing for the primary current and a sensed zero crossing for the primary current.

17. The system of claim 16, the operating mode comprising a flyback mode when the DC input signal is below a threshold and the operating mode further comprising a forward mode when the DC input signal is above the threshold.

* * * * *